US012625455B2

(12) United States Patent
Ambe

(10) Patent No.: US 12,625,455 B2
(45) Date of Patent: May 12, 2026

(54) IMAGE FORMING APPARATUS

(71) Applicant: BROTHER KOGYO KABUSHIKI KAISHA, Nagoya (JP)

(72) Inventor: Yurimi Ambe, Nisshin (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 19/046,906

(22) Filed: Feb. 6, 2025

(65) Prior Publication Data

US 2025/0306518 A1 Oct. 2, 2025

(30) Foreign Application Priority Data

Mar. 26, 2024 (JP) ................................ 2024-050568

(51) Int. Cl.
*B65H 1/04* (2006.01)
*G03G 15/00* (2006.01)

(52) U.S. Cl.
CPC .......... *G03G 15/6573* (2013.01); *B65H 1/04* (2013.01); *G03G 15/6514* (2013.01); *B65H 2402/31* (2013.01); *B65H 2402/45* (2013.01); *B65H 2402/60* (2013.01); *B65H 2405/11162* (2013.01); *B65H 2405/11164* (2013.01); *B65H 2405/324* (2013.01); *B65H 2407/21* (2013.01); *G03G 2215/00358* (2013.01)

(58) Field of Classification Search
CPC ................. B65H 1/04; B65H 2407/21; B65H 2405/11164; B65H 2405/11162; B65H 2405/324; B65H 2405/1124; B65H 2402/31; B65H 2402/45; B65H 2402/60; G03G 15/6514; G03G 2215/00392; G03G 2215/00358; G03G 21/1633
See application file for complete search history.

(56) References Cited

U.S. PATENT DOCUMENTS 7,748,691 B2 * 7/2010 Mizuguchi ......... G03G 15/6514 271/171
9,604,806 B2 * 3/2017 Okura ...................... B65H 1/04
(Continued)

FOREIGN PATENT DOCUMENTS

JP 2005-060059 A 3/2005
JP 2017-178603 A 10/2017
(Continued)

*Primary Examiner* — Luis A Gonzalez
(74) *Attorney, Agent, or Firm* — Merchant & Gould P.C.

(57) ABSTRACT

An image forming apparatus includes a device body having an opening, a cover body configured to move between open and closed positions to open and close the opening, a sheet conveyer, a first tray, a second tray disposed opposite to the sheet conveyer across the first tray when the cover body is at the open position, a third tray configured to move between a stowed position between the cover body and the second tray and a pulled-out position pulled away from the first tray, and two guide members configured to guide the first tray. The second tray has two first attachment holes. Each of the guide members has a second attachment hole. The first attachment holes overlap the second attachment holes, respectively. The second tray and each of the guide members are fixed to the cover body with a common fastening member inserted into the first and second attachment holes.

10 Claims, 18 Drawing Sheets

(56) References Cited

U.S. PATENT DOCUMENTS

| | | | | |
|---|---|---|---|---|
| 2020/0307263 | A1 | 10/2020 | Taketsugu et al. | |
| 2022/0185605 | A1* | 6/2022 | Nitta .................. | G03G 15/6511 |

FOREIGN PATENT DOCUMENTS

| | | | |
|---|---|---|---|
| JP | 2018-135173 | A | 8/2018 |
| JP | 2020-164297 | A | 10/2020 |
| JP | 2021-046326 | A | 3/2021 |
| JP | 2023-072452 | A | 5/2023 |

* cited by examiner

IMAGE FORMING APPARATUS

REFERENCE TO RELATED APPLICATIONS

This application claims priority from Japanese Patent Application No. 2024-050568 filed on Mar. 26, 2024. The entire content of the priority application is incorporated herein by reference.

BACKGROUND ART

The present disclosure relates to an image forming apparatus.

There is known an image forming apparatus including a sheet tray that supports sheets to be fed to a sheet conveyer and a tray cover that supports the sheet tray.

In the above-mentioned conventional image forming apparatus, the tray cover has a cover body, a pair of ribs, a cover plate, and a pair of link rails. The cover body, the pair of ribs, the cover plate, and the link rails are integrally molded.

SUMMARY

In addition to the above parts, other parts such as ribs for reinforcement are also integrally molded with the tray cover, making the structure of the tray cover complex and making it difficult to mold the tray cover by injection molding.

Furthermore, if the cover body and the other parts such as the pair of ribs, the cover plate, and the pair of link rails are formed as separate parts, the number of parts to be assembled to form the tray cover increases, making it difficult to assemble the tray cover.

At least one aspect of the present disclosure is advantageous to provide an image forming apparatus that can improve easiness of the assembly of the tray cover.

According to an aspect of the present disclosure, there is provided an image forming apparatus including a device body having an opening, a cover body supported by the device body to be rotatable about a rotation axis and configured to move between an open position to open the opening and a closed position to close the opening by rotating about the rotation axis, a sheet conveyer provided in the device body, a first tray configured to support sheets to be fed to the sheet conveyer, a second tray supported by the cover body and disposed opposite to the sheet conveyer across the first tray when the cover body is at the open position, a third tray configured to move between a stowed position between the cover body and the second tray and a pulled-out position pulled away from the first tray relative to the stowed position, and two guide members supported by the cover body and provided on both sides in a direction of the rotation axis of the first tray and configured to guide the first tray. The second tray has two first attachment holes for fixing the second tray to the cover body at both ends in the direction of the rotation axis. Each of the guide members has a second attachment hole for fixing the guide member to the cover body. The first attachment holes overlap the second attachment holes of the guide members, respectively. The second tray and each of the guide members are fixed to the cover body with a common fastening member inserted into the first attachment hole and the second attachment hole.

DESCRIPTION

Hereinafter, embodiments of the present disclosure will be described with reference to the accompanying drawings.

[Image Forming Apparatus]

Figure 1:
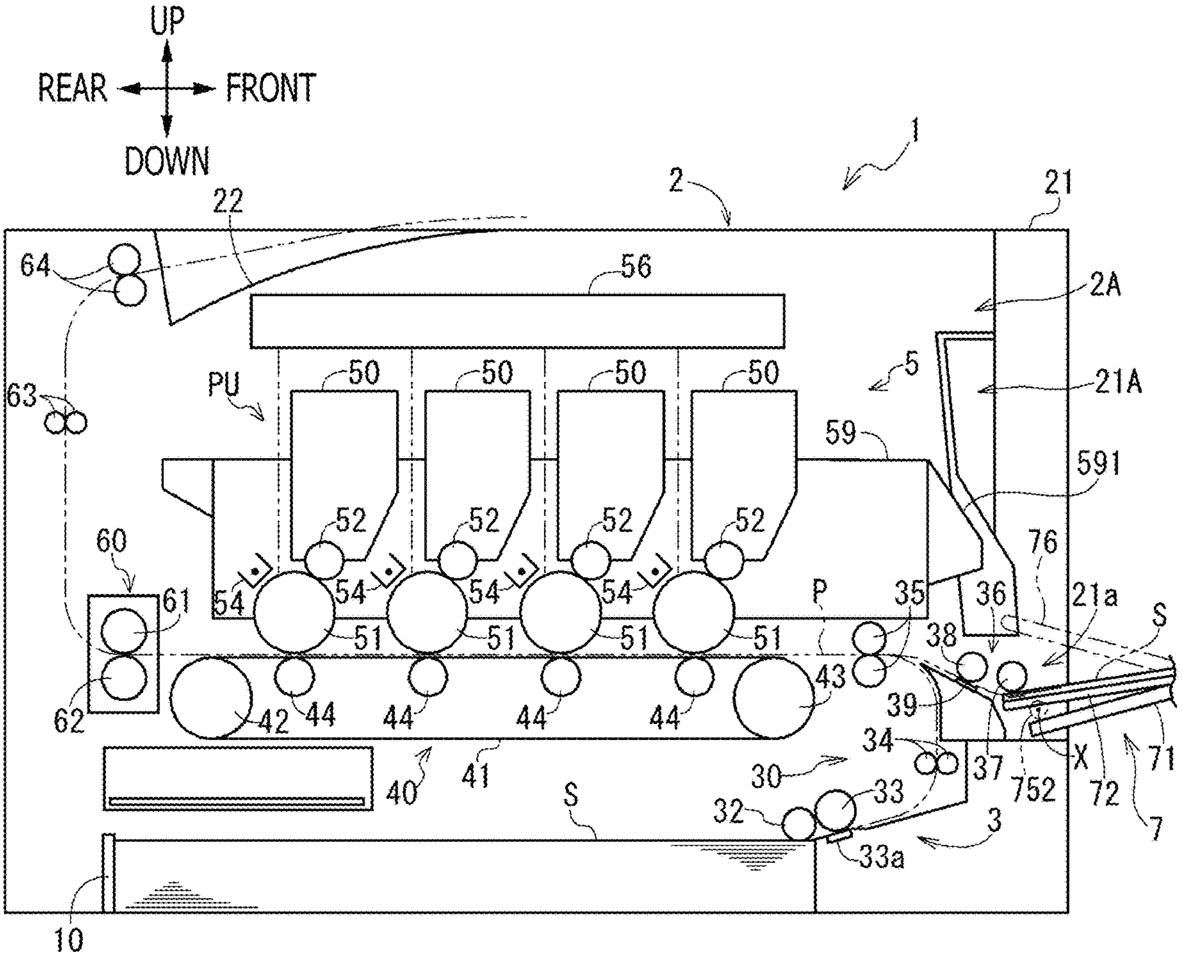
FIG. 1 is a central cross-sectional view of an image forming apparatus.
Figure 2:
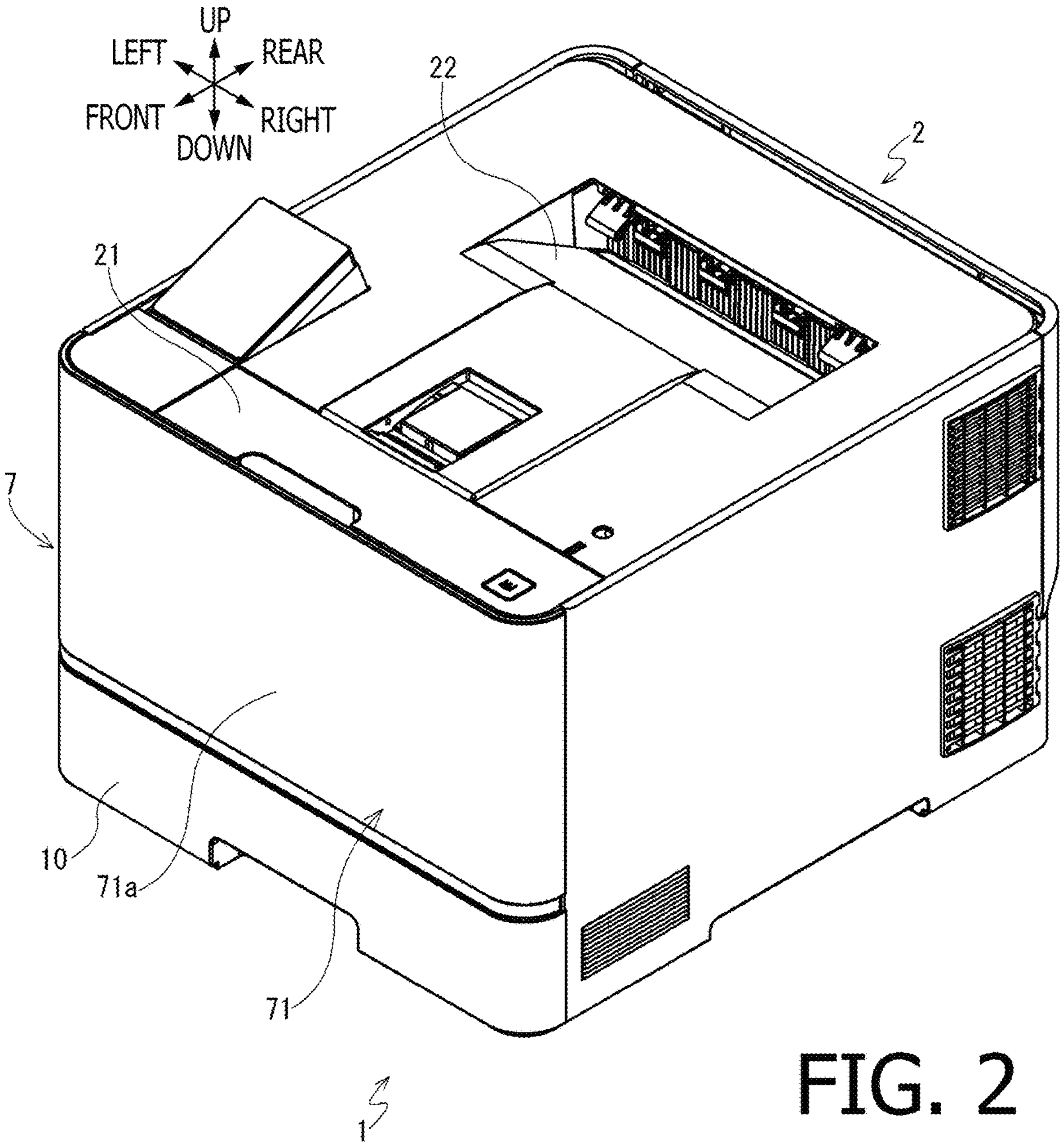
FIG. 2 is a perspective view of the image forming apparatus.

FIGS. 1 and 2 shows an image forming apparatus 1 according to an embodiment of the present disclosure. The image forming apparatus 1 is a color laser printer that forms an image of multiple colors on a sheet S using the electro-photographic method.

In the following description, the right side in FIG. 1 is defined as the front side of the image forming apparatus 1, the left side in FIG. 1 is defined as the rear side of the image forming apparatus 1, the front side in FIG. 1 is defined as the left side of the image forming apparatus 1, and the rear side in FIG. 1 is defined as the right side of the image forming apparatus 1. The upper side and the lower side in FIG. 1 are defined as the upper side and the lower side of the image forming apparatus 1, respectively.

As shown in FIGS. 1 and 2, the image forming apparatus 1 includes a device body 2, a sheet feeding section 3 having a sheet feeding tray 10 that supports sheets S and a sheet conveyer 30 that conveys sheets S, and an image forming section 5 that forms images on the sheets S conveyed by the sheet feeding section 3.

The device body 2 is formed in a rectangular parallelepiped shape and houses the sheet feeding section 3 and the image forming section 5. A front opening 2A opens at a front surface of the device body 2, and the device body 2 has a front cover 21 that opens and closes the front opening 2A.

The sheet feeding section 3 is disposed at a bottom portion of the device body 2 and conveys the sheets S supported by the sheet feeding tray 10 to the image forming section 5 using the sheet conveyer 30. The sheet feeding tray 10 is configured to be slidable in the front-back direction, and is movable between a stowed position at which the sheet feeding tray 10 is stowed in the device body 2 and a pulled-out position at which the sheet feeding tray 10 is pulled forward from the stowed position.

The sheet conveyer 30 includes a feeding roller 32, a separation roller 33, a separation pad 33*a*, a conveying roller pair 34, and a resist roller pair 35. A conveying path P for the sheet S extending from the sheet feeding tray 10 through the image forming section 5 to the sheet ejection tray 22 is formed in the device body 2.

The sheets S supported by the sheet feeding tray 10 are separated one by one by the sheet feeding roller 32, the separation roller 33 and the separation pad 33*a*, and fed to the conveying path P. The sheet feeding roller 32 is a roller that conveys the sheets S from the sheet feeding tray 10 to the image forming section 5. The separation roller 33 and the separation pad 33*a* constitute a separation unit that separates the sheets S supported by the sheet feeding tray 10 one by one.

The sheet S fed into the conveying path P is conveyed toward the image forming section 5 by the conveying roller pair 34 and the resist roller pair 35. The resist roller pair 35 regulates movement of a leading edge of the sheet S being conveyed to stop sheet S once, and then conveys the sheet S toward the image forming section 5 at a predetermined timing.

The front cover 21 has a sheet feeding opening 21*a* through which the sheets S can be fed toward the image forming section 5. The sheet feeding opening 21*a* is at a front end portion of the device body 2.

The image forming apparatus 1 includes a sheet tray 7 configured to open and close the sheet feeding opening 21*a*. The sheet tray 7 has an MP tray 72 that supports the sheets S and an MP tray cover 71 that supports the MP tray 72.

The MP tray cover 71 is supported by the front cover 21 rotatably about a rotation axis X of a rotary shaft 752.

The MP tray cover 71 is movable between an open position that opens the sheet feeding opening 21*a* and a closed position that closes the sheet feeding opening 21*a* by rotating about the rotation axis X. The rotation axis X of the rotary shaft 752 extends in the right-left direction. In other words, the rotation axis X direction is the right-left direction.

The MP tray 72 supported by the MP tray cover 71 is configured to support the sheets S when the MP tray cover 71 is at the open position. The sheets S supported by the MP tray 72 are fed to the image forming section 5 through the sheet feeding opening 21*a*.

The device body 2 includes a sheet conveyer 36 that conveys the sheets S supported by the MP tray 72 to the image forming section 5. The sheet conveyer 36 has a sheet feeding roller 37, a separation roller 38, and a separation pad 39.

The sheets S supported by the MP tray 72 are fed to the sheet conveyer 36, separated one by one by the sheet feeding roller 37, the separation roller 38, and the separation pad 39, and fed to the conveying path P. The sheets S fed to the conveying path P are conveyed by the resist roller pair 35 toward the image forming section 5.

The image forming section 5 is disposed above the sheet feeding section 3 and includes four toner cartridges 50, which are arranged side by side in the front-back direction, and photosensitive drums 51 respectively corresponding to the toner cartridges 50. The toner cartridges 50 are provided for black, yellow, magenta, and cyan colors, respectively. Each toner cartridge 50 includes a developer roller 52.

The toner cartridges 50 are removably supported by a drawer 59. The drawer 59 is configured to be attached to and detached from the device body 2 through the front opening 2A of the device body 2 by opening the front cover 21. The drawer 59 is configured to move between a first position at which the drawer 59 is positioned inside the device body 2 and a second position at which the drawer 59 is at least partially positioned outside the device body 2.

The drawer 59 has a handle 591 for moving the drawer 59 between the first position and the second position. The handle 591 is at a front end portion of the drawer 59. When a user moves the drawer 59 between the first position and the second position, the user can easily move the drawer 59 by grasping the handle 591.

Each photosensitive drum 51 is formed in substantially cylindrical shape with the right-left direction as an axial direction and is rotatably supported by the drawer 59. Each developing roller 52 extends in the right-left direction and is rotatably supported by the toner cartridge 50. In other words, the drawer 59 supports the photosensitive drums 51 and the developing rollers 52. Each developer roller 52 supplies toner to the photosensitive drum 51.

The device body 2 has an exposure device 56 that exposes surfaces of the photosensitive drums 51. The exposure device 56 includes not-shown laser diodes, polarizers, lenses, and mirrors. The exposure device 56 is configured to emit a light beam to each photosensitive drum 51 to expose the surface of each photosensitive drum 51.

A transfer belt 41 is disposed below the photosensitive drums 51 across the conveying path P to oppose the photosensitive drum 51. The transfer belt 41 is in contact with the photosensitive drums 51. The transfer belt 41 is put on a drive roller 42 and a driven roller 43 disposed in front of the drive roller 42. Transfer rollers 44 are disposed at positions opposing respective photosensitive drums 51 across the transfer belt 41. In the image forming section 5, the transfer belt 41, the drive roller 42, the driven roller 43, and the transfer rollers 44 constitutes a belt system 40.

The image forming section 5 includes chargers 54 for charging respective photosensitive drums 51. The chargers 54 are supported by the drawer 59. Each photosensitive drum 51 uniformly charged by the charger 54 is selectively exposed by the exposure device 56. This exposure selectively removes charge from the surface of each photosensitive drums 51 and forms an electrostatic latent image on the surface of the photosensitive drum 51.

The toner contained in the toner cartridge 50 is positively charged and carried on a surface of the developing roller 52. A developing bias is applied to the developing roller 52. When the electrostatic latent image formed on the photosensitive drum 51 faces the developing roller 52, potential difference between the electrostatic latent image and the developing roller 52 causes toner to be supplied from the developing roller 52 to the electrostatic latent image. A toner image is thereby formed on the surface of the photosensitive drum 51.

The sheet S conveyed toward the image forming section 5 reaches the transfer belt 41, is conveyed by the transfer belt 41, and passes sequentially between the transfer belt 41 and the photosensitive drums 51. The toner image carried on the surface of the photosensitive drum 51 is transferred to the sheet S by the transfer bias applied to the transfer roller 44 when the toner image faces the sheet S.

The transfer belt 41 in the present embodiment is configured as a conveyor belt that conveys the sheet S onto which the toner image is to be transferred. However, the transfer belt 41 may also be configured as an intermediate transfer belt onto which the toner image is to be transferred and from which the transferred toner image is to be further transferred onto the sheet S.

The sheet S onto which the toner image has been transferred is conveyed to a fuser 60. The fuser 60 includes a heating roller 61, and a pressure roller 62 that is pressed against the heating roller 61. The sheet S conveyed to the fuser 60 is heat-fixed with the toner image while passing between the heating roller 61 and the pressure roller 62. In other words, the fuser 60 fixes the toner image on the sheet S.

The sheet S on which the toner image has been heat-fixed is conveyed downstream in the conveying direction from the fuser 60, further conveyed by an intermediate sheet ejection roller pair 63 and a sheet ejection roller pair 64 disposed downstream of the intermediate sheet ejection roller pair 63 in the conveying direction, and discharged on a sheet ejection tray 22.

In the image forming apparatus 1, the drawer 59 and the toner cartridges 50, the photosensitive drums 51, the chargers 54 and the like supported by the drawer 59 constitute a process unit PU that forms a toner image on the sheet S. In the process unit PU, the drawer 59 may support the photosensitive drums 51 as in the present embodiment, or the toner cartridges 50 may support the photosensitive drums 51. The process unit PU may also include the fuser 60. The image forming apparatus 1 may have no drawer 59 and may be configured so that a process unit including the toner cartridges 50 and the photosensitive drums 51 can be detachably attached.

[Sheet Tray]

As shown in FIGS. 2 through 6, the sheet tray 7 includes the MP tray cover 71, the MP tray 72, an extension cover 73, an extension tray 74, and guide members 75.

The MP tray cover 71 is a plate-shaped cover member. the MP tray cover 71 has a first surface 71*a* facing forward when the MP tray cover 71 is at the closed position and a second side 71*b* facing rearward when the MP tray cover 71 is at the closed position. The second side 71*b* is opposite the first surface 71*a*. when the MP tray cover 71 is at the closed position, the first surface 71*a* constitutes a portion of a front face of the exterior of the image forming apparatus 1. The MP tray 72 is supported on the second side 71*b* of the MP tray cover 71.

The MP tray 72 has a support surface 721 that supports the sheets S. The support surface 721 faces upward when the MP tray cover 71 is at the open position, the MP tray 72 is disposed in front of the sheet conveyer 36 when the MP tray cover 71 is at the open position.

The sheets S supported by the support surface 721 are fed to the sheet conveyer 36 by being conveyed toward the rear side. In other words, a feeding direction of the sheets S supported by the support surface 721 is rearward.

The MP tray 72 has side guides 722 that project upward from the support surface 721 and guide the left and right edges of the sheets S supported on the support surface 721. The side guides 722 are movable in the right-left direction and are provided in pairs on each side.

The extension cover 73 is formed by a plate-shaped member that is disposed substantially parallel to the second side 71*b* of the MP tray cover 71. The extension cover 73 is supported by the MP tray cover 71. The extension cover 73 is formed separately from the MP tray cover 71.

The extension cover 73 is in front of the MP tray 72 when the MP tray cover 71 is at the open position. In other words, the extension cover 73 is on the opposite side of the sheet conveyer 36 across the MP tray 72 when the MP tray cover 71 is at the open position. The extension cover 73 is configured to guide the sheets S supported by the MP tray 72.

The extension tray 74 is formed by a plate-shaped member that is disposed between the MP tray cover 71 and the extension cover 73. The extension tray 74 is movable between a stowed position which is a position where the extension tray 74 is disposed between the MP tray cover 71 and the extension cover 73 (i.e., the position shown in FIG. 13), and a pulled-out position which is a position where the extension tray 74 is pulled out from the stowed position in a direction away from the MP tray 72 (i.e., the position shown in FIG. 14).

The extension tray 74 is supported by the extension cover 73 and the MP tray cover 71 to be movable between the stowed position and the pulled-out position. The extension tray 74 is configured to guide the sheets S by being moved to the pulled-out position when the MP tray cover 71 is at the open position.

The guide members 75 are supported by the MP tray cover 71 on both sides of the MP tray 72 in the right-left direction. The guide members 75 are formed separately from the MP tray cover 71 and are attached to the second side 71*b* of the MP tray cover 71. The guide members 75 support the MP tray 72.

[Guide Member]

The guide member 75 has a first guide member 75A and a second guide member 75B. The first guide member 75A and the second guide member 75B are spaced apart in the right-left direction. The first guide member 75A is disposed to the left of the MP tray 72 and the second guide member 75B is disposed to the right of the MP tray 72.

Figure 7A:
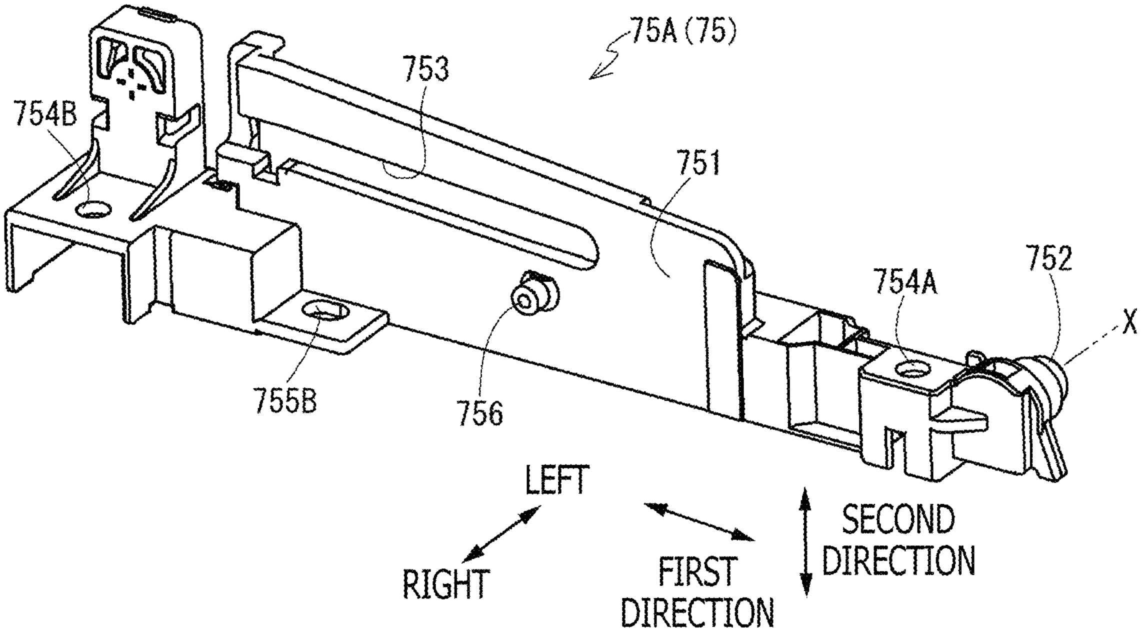
FIG. 7A is a perspective view of a first guide member.
Figure 7B:
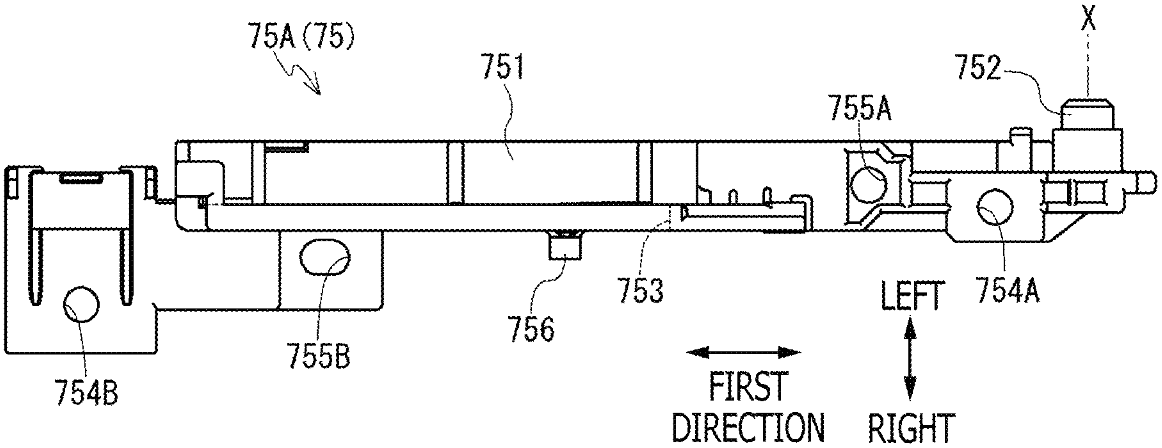
FIG. 7B is a plan view of the first guide member.

As shown in FIGS. 7A and 7B, the first guide member 75A has a guide body 751, a rotary shaft 752, a long hole 753, attachment holes 754A and 754B, positioning holes 755A and 755B, and a boss 756.

The guide body 751 is formed of a long member extending in the first direction, which is a radial direction of the rotation axis X. The first direction is orthogonal to the direction of the rotation axis X. The guide body 751 extends in the vertical direction when the MP tray cover 71 is at the closed position.

The rotary shaft 752 extends in the right-left direction, which is the direction of the rotation axis X. The rotary shaft 752 is at a lower end portion of the guide body 751 when the MP tray cover 71 is at the closed position and at a rear end portion of the guide body 751 when the MP tray cover 71 is at the open position.

The first direction is a sheet feeding direction when the MP tray cover 71 is at the open position. A side closer the rotary shaft 752 in the first direction is a downstream side in the sheet feeding direction, and the side away from the rotary shaft 752 in the first direction is an upstream side in the sheet feeding direction.

The long hole 753 is disposed away from the rotation axis X of the rotary shaft 752 in the first direction. The long hole 753 penetrates in the right-left direction, and a longitudinal direction of the long hole 753 is along the first direction.

The attachment holes 754A and 754B are formed to the guide body 751 and penetrate in a second direction, which is orthogonal to the first direction and the right-left direction. The second direction is orthogonal to the second side 71*b* of the MP tray cover 71 on which the first guide member 75A is mounted. Fastening members such as screws can be inserted through the attachment holes 754A and 754B. The attachment holes 754A and 754B are holes for fixing the guide member 75 to the MP tray cover 71.

The attachment hole 754A is disposed between the rotary shaft 752 and the long hole 753 in the first direction. The attachment hole 754B is disposed at an end portion of the long hole 753 away from the rotary shaft 752 in the first direction.

The positioning holes 755A and 755B are formed to the guide body 751 and penetrate in the second direction. The positioning holes 755A and 755B are disposed between the attachment holes 754A and 754B in the first direction.

The positioning hole 755A is disposed between the attachment hole 754A and the long hole 753 in the first direction. The positioning hole 755B is disposed between the positioning hole 755A and the attachment hole 754B in the first direction.

The boss 756 projects from a right side surface of the guide body 751 to the right. The boss 756 is disposed at an end portion of the long hole 753 closer to the rotary shaft 752 in the first direction.

Figure 8A:
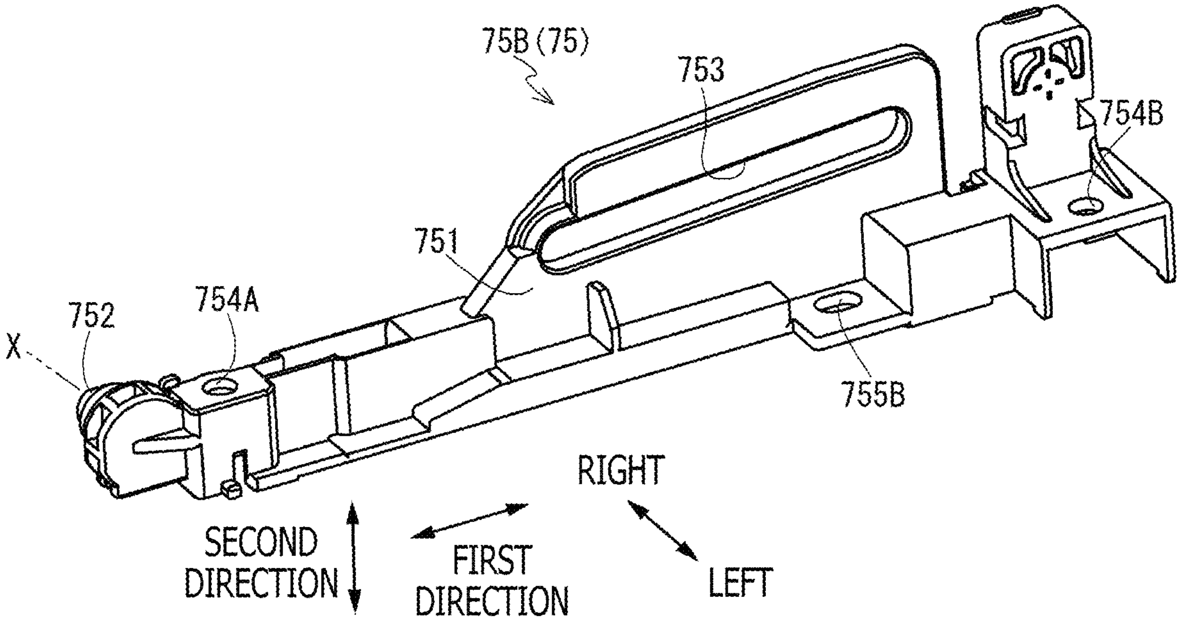
FIG. 8A is a perspective view of a second guide member.
Figure 8B:
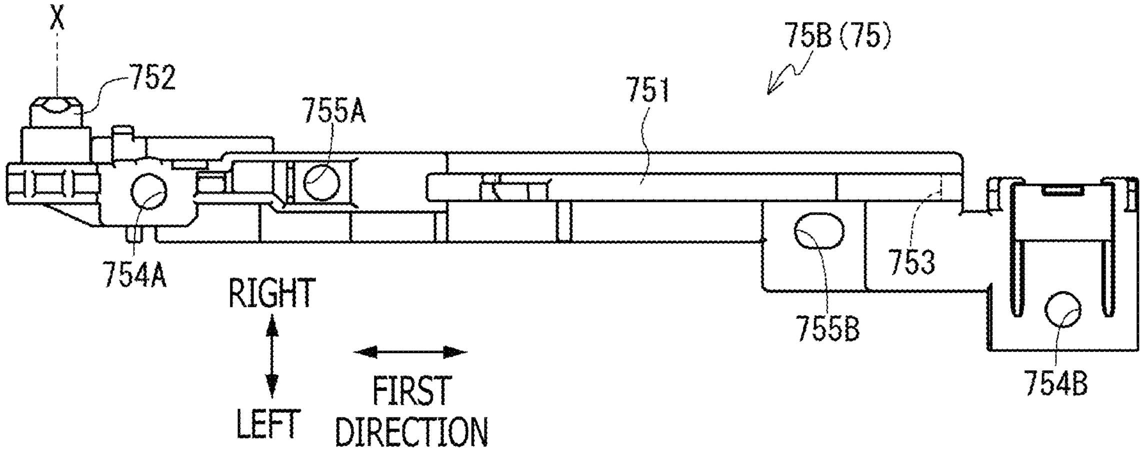
FIG. 8B is a plan view of the second guide member.

As shown in FIGS. 8A and 8B, the second guide member 75B is symmetrically formed with respect to the first guide member 75A and differs from the first guide member 75A in that it does not have the boss 756. Since the other configuration is similar to that of the first guide member 75A, specific description of the second guide member 75B is herein omitted.

In the following description, when it is necessary to distinguish between the first guide member 75A and the second guide member 75B, it will be specified whether the description is about the first guide member 75A or the second guide member 75B, and when it is not necessary to distinguish between the first guide member 75A and the second guide member 75B, the first guide member 75A and the second guide member 75B will be collectively referred to as the guide member 75.

[Extension Cover]

Figure 9:
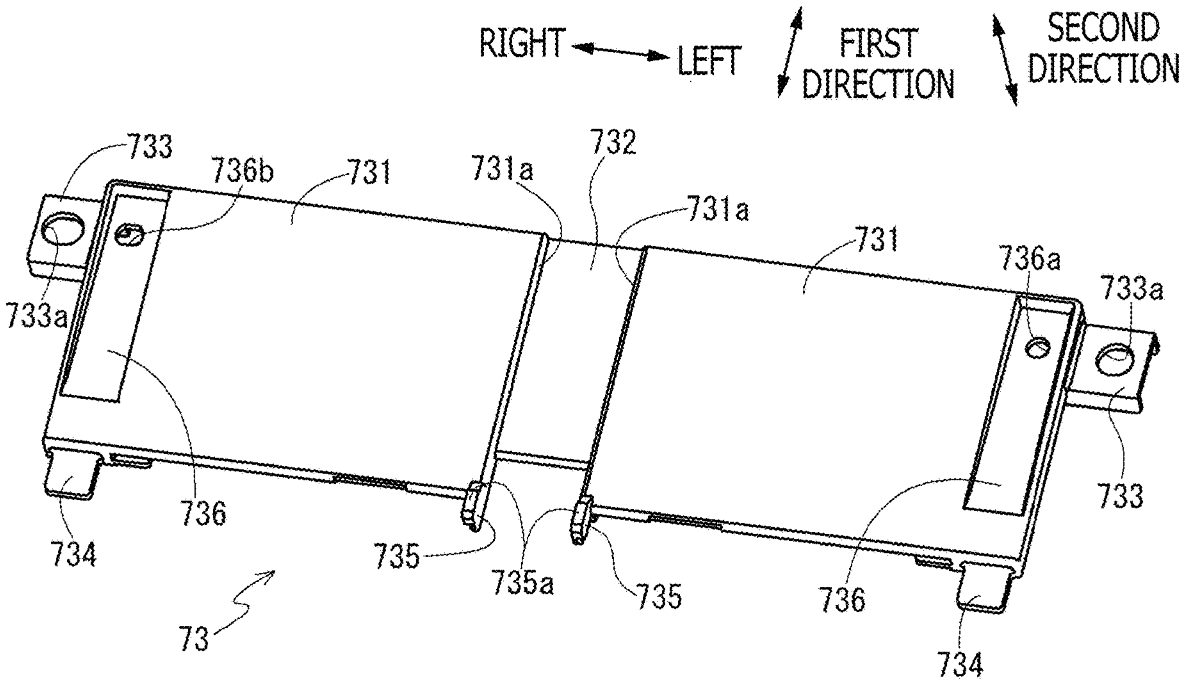
FIG. 9 is a perspective view of an extension cover.

As shown in FIG. 9, the extension cover 73 has a sheet guiding surface 731, a groove 732, projecting pieces 733, first projections 734, second projections 735, and positioning hole forming parts 736. The sheet guiding surface 731 is a surface that is substantially parallel to the second side 71*b* of the MP tray cover 71 and faces upward when the MP tray cover 71 is at the open position. The sheet guiding surface 731 of the extension cover 73 guides the sheets supported by the MP tray 72.

The groove 732 is formed in the shape of a groove that is concave downward from the sheet guiding surface 731 and is disposed substantially at the center of the sheet guiding surface 731 in the right-left direction. The groove 732 extends in the first direction.

The projecting pieces 733 are at the left and right ends of the extension cover 73. The projecting pieces 733 protrude in the right-left direction from the left and right ends of the sheet guiding surface 731. The projecting piece 733 on the left projects leftward from the left end of the sheet guiding surface 731, and the projecting piece 733 on the right projects rightward from the right end of the sheet guiding surface 731.

An attachment hole 733*a* for attaching the extension cover 73 to the MP tray cover 71 is formed to each projecting piece 733. The attachment hole 733*a* penetrates the projecting piece 733 in the second direction. A fastening member such as a screw can be inserted into the attachment hole 733*a*.

When the MP tray cover 71 is at the open position, the projecting pieces 733 and the attachment holes 733*a* are at the front end portion of the extension cover 73, which is an upstream end of the extension cover 73 in the first direction.

The first projection 734 is at a downstream end of the extension cover 73 in the first direction. The first projection 734 projects downstream from the downstream end of the sheet guiding surface 731 in the first direction. The extension cover 73 has a plurality of first projections 734. The first projections 734 are disposed at the left and right end portions of the sheet guiding surface 731.

The sheet guiding surface 731 has boundaries 731*a* with the groove 732. The boundaries 731*a* are at the left and right ends of the groove 732.

The second projections 735 are at downstream end portions of the boundaries 731*a* of the sheet guiding surface 731 in the first direction. Each second projection 735 projects away from the MP tray cover 71 than the sheet guiding surface 731 in the second direction. Each second projection 735 has a tip surface 735*a* that is farthest away from the MP tray cover 71 in the second direction.

The tip surface 735*a* is located at an upper end of the second projection 735 when the MP tray cover 71 is at the open position. The tip surface 735*a* is an upper end of the downstream end of the extension cover 73 in the first direction when the MP tray cover 71 is at the open position.

The positioning hole forming parts 736 are at the left and right ends of the extension cover 73. The positioning hole forming part 736 on the left is formed at the left end of the sheet guiding surface 731, and the positioning hole forming part 736 on the right is formed at the right end of the sheet guiding surface 731. The positioning hole forming parts 736 are recessed in the second direction toward the MP tray cover 71 than the sheet guiding surface 731.

A positioning hole 736*a* that penetrates in the second direction is formed to the positioning hole forming part 736 on the left, and a positioning hole 736*b* that penetrates in the second direction is formed to the positioning hole forming part 736 on the right.

[MP Tray Cover]

Figure 10:
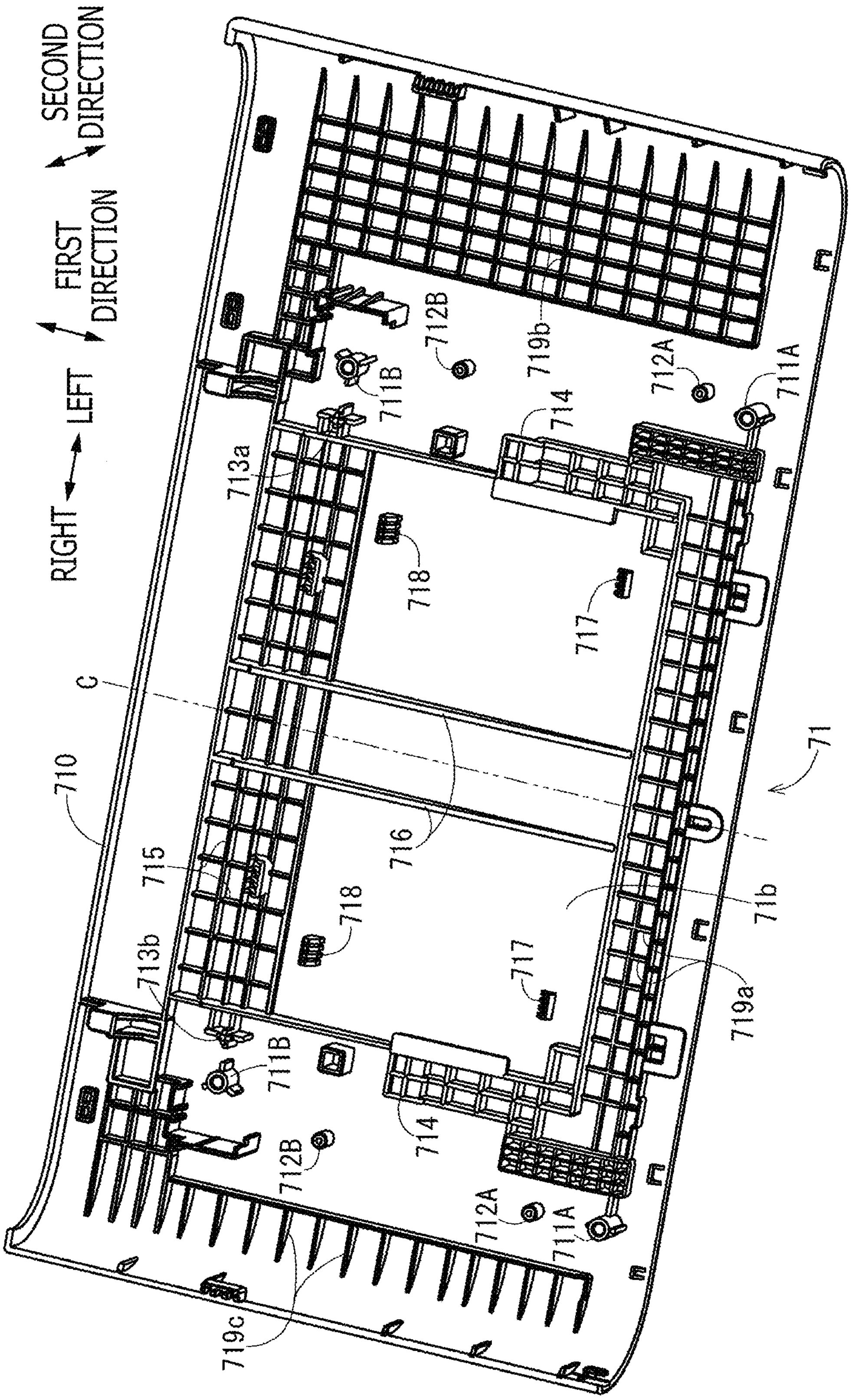
FIG. 10 is a perspective view of the MP tray cover.
Figure 11:
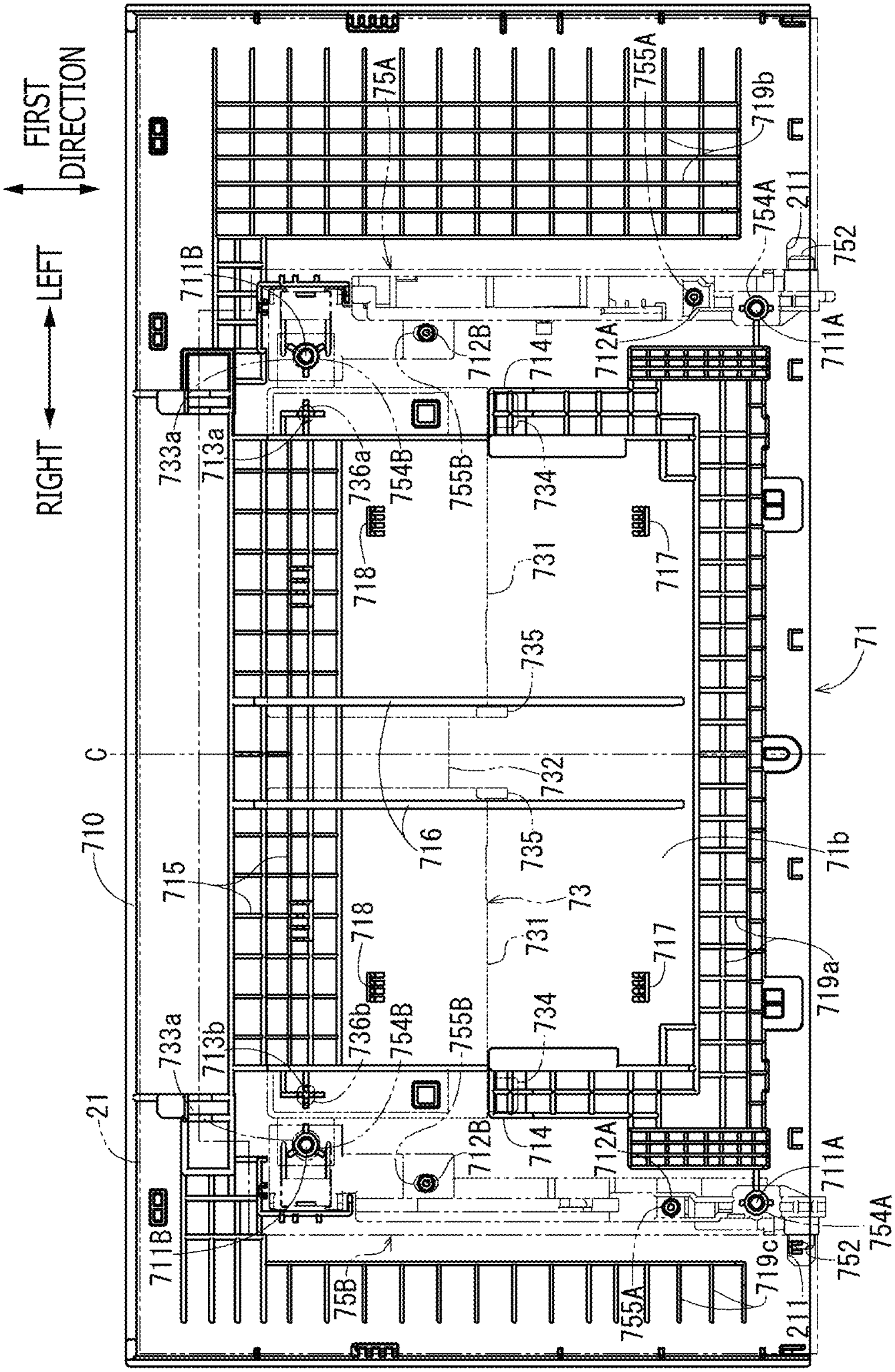
FIG. 11 is a rear view of the MP tray cover.

As shown in FIGS. 10 and 11, the MP tray cover 71 has boss holes 711A and 711B corresponding to the attachment holes 754A and 754B of the guide member 75, and positioning bosses 712A and 712B into which the positioning holes 755A and 755B of the guide member 75 fit.

The boss holes 711A and 711B and the positioning bosses 712A and 712B are formed on the second side 71*b* of the MP tray cover 71 to correspond to the positions where the first guide member 75A and second guide member 75B are to be attached. The boss holes 711A and 711B and the positioning bosses 712A and 712B corresponding to the first guide member 75A are formed to the left of a center line C of the MP tray cover 71. The boss holes 711A and 711B and the positioning bosses 712A and 712B corresponding to the second guide member 75B are formed to the right of the center line C.

The guide member 75 is positioned with respect to the MP tray cover 71 when the positioning hole 755A fits into the positioning boss 712A and the positioning hole 755B fits into the positioning boss 712B.

For example, the positioning boss 712A is formed in a cylindrical shape, and the positioning hole 755A is formed in a circular shape corresponding to the shape of the positioning boss 712A. When the positioning boss 712A fits into the positioning hole 755A, the guide member 75 is positioned in directions parallel to the second side 71*b*.

For example, the positioning boss 712B is formed in a cylindrical shape and the positioning hole 755B is formed in a long hole with a longitudinal direction extending in the first direction. When the positioning boss 712B fits into the positioning hole 755B, rotational movement of the guide member 75 in the directions parallel to the second side 71*b* about the positioning boss 712A is restricted.

The MP tray cover 71 has positioning bosses 713*a* and 713*b* that fit into the positioning holes 736*a* and 736*b* of the extension cover 73. The positioning bosses 713*a* and 713*b* are formed at positions corresponding to the positioning holes 736*a* and 736*b* of the extension cover 73 to be attached to the second side 71*b* of the MP tray cover 71. The positioning boss 713*a* is formed to the left of the center line C of the MP tray cover 71, and the positioning boss 713*b* is formed to the right of the center line C of the MP tray cover 71.

The extension cover 73 is positioned with respect to the MP tray cover 71 when the positioning boss 713*a* fits into the positioning hole 736*a* and the positioning boss 713*b* fits into the positioning hole 736*b*.

For example, the positioning boss 713*a* is formed in the shape of the plus sign and the positioning hole 736*a* is formed in a circular shape corresponding to the shape of the positioning boss 713*a* When the positioning boss 713*a* fits into the positioning hole 736*a*, the extension cover 73 is positioned in the directions parallel to the second side 71*b*.

For example, the positioning boss 713*b* is formed in the shape of the plus sign and the positioning hole 736*b* is formed in a long hole with a longitudinal direction extending in the right-left direction. When the positioning boss 713*b* fits into the positioning hole 736*b*, rotational movement of the extension cover 73 in the directions parallel to the second side 71*b* about the positioning boss 713*a* is restricted.

The boss holes 711B of the MP tray cover 71 are formed at positions corresponding to the attachment holes 733*a* of the extension cover 73 which is to be attached to the second side 71*b* of MP tray cover 71.

The MP tray cover 71 has insertion holes 714 into which the first projections 734 of the extension cover 73 are to be inserted. The insertion holes 714 are formed to the left and right of the center line C of the MP tray cover 71, to correspond to the first projections 734 of the extension cover 73.

[Procedure for Fixing Guide Member and Extension Cover to MP Tray Cover]

The guide member 75 and extension cover 73 are fixed to the MP tray cover 71 in the following procedure.

First, the extension cover 73 is placed on the MP tray cover 71 with the first projections 734 of the extension cover 73 inserted into the insertion holes 714 of the MP tray cover 71 and the positioning holes 736*a* and 736*b* of the extension cover 73 fitted to the positioning bosses 713*a* and 713*b* of the MP tray cover 71.

In the state where the positioning holes 736*a* and 736*b* are fitted to the positioning bosses 713*a* and 713*b*, the attachment holes 733*a* of the extension cover 73 and the boss holes 711B of the MP tray cover 71 are aligned (see FIG. 11).

The guide members 75 are placed on the MP tray cover 71 with the positioning holes 755A and 755B of the guide member 75 fitted to the positioning bosses 712A and 712B of the MP tray cover 71.

In the state where the positioning holes 755A and 755B are fitted to the positioning bosses 712A and 712B, the attachment holes 754A and 754B of the guide member 75 and the boss holes 711A and 711B of the MP tray cover 71 are aligned (see FIG. 11).

In the state where the extension cover 73 and the guide members 75 are placed on the MP tray cover 71, the attachment holes 733*a* of the extension cover 73 and the attachment holes 754B of the guide members 75 overlap.

Next, by inserting screws 79 through the attachment holes 754A of the guide members 75 and screwing them into the boss holes 711A, and by inserting the screws 79 through the attachment holes 754B of the guide members 75 and the attachment holes 733*a* of the extension cover 73 and screwing them into the boss holes 711B, the guide member 75 and the extension cover 73 are fixed to the MP tray cover 71.

Figure 12:
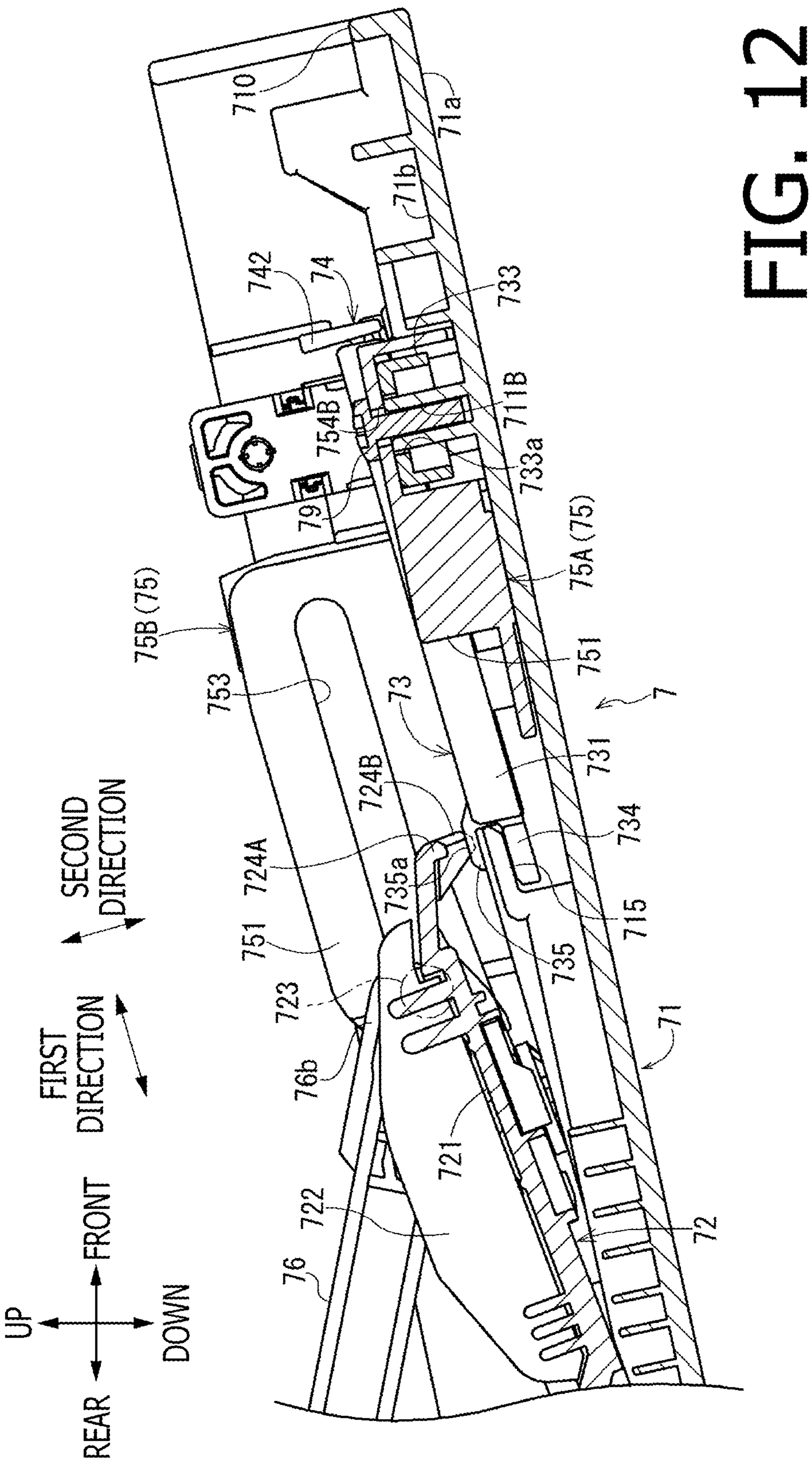
FIG. 12 is a side cross-sectional view showing a state where the guide member and the extension cover are screwed together and fixed to the MP tray cover with a single screw.

In this case, as shown in FIG. 12, one screw 79 is inserted through the attachment hole 754B of one of the guide members 75 and one of the attachment holes 733*a* of the extension cover 73, and the guide member 75 and the extension cover 73 are co-fastened to the MP tray cover 71 by the common screw 79.

By fixing the guide member 75 and the extension cover 73 to the MP tray cover 71 with the same screw 79 inserted through the attachment holes 754B and 733*a*, the ease of assembly of the guide member 75 and the extension cover 73 to the MP tray cover 71 can be improved.

In the extension cover 73, the attachment holes 733*a* through which the screws 79 are inserted are formed on the projecting pieces 733 projecting in the right-left direction from the left and right ends of the sheet guiding surface 731. Therefore, the screws 79 inserted into the attachment holes 733*a* do not interfere with the sheet S guided by the sheet guiding surface 731.

Furthermore, the extension cover 73 has the first projections 734 that are inserted into the insertion holes 714 of the MP tray cover 71 in addition to the projecting pieces 733 that are fastened to the MP tray cover 71 by the screws 79. The first projections 734 are disposed at the downstream end portion of the extension cover 73 in the first direction, while the projecting pieces 733 to which the attachment holes 733*a* are formed are disposed at the upstream end portion of the extension cover 73 in the first direction.

Therefore, the extension cover 73 can be rigidly fixed to the MP tray cover 71, and the rigidity of the MP tray cover 71 and the extension cover 73 as a whole can be increased. This makes it possible to prevent the MP tray cover 71 and extension cover 73 as a whole from flexing when a load is applied to a leading edge of the tray such as the MP tray cover 71 or the extension tray 74.

The fastening members for securing the guide member 75 and the extension cover 73 to the MP tray cover 71 are not limited to the screws 79, but other fastening members such as bolts or snap-fits may be used.

[Ribs Formed on MP Tray Cover]

The MP tray cover 71 has a handhold rib 710, reinforcement ribs 715, slide ribs 716, first engagement ribs 717, second engagement ribs 718, and reinforcement ribs 719*a*, 719*b* and 719*c*. The handhold rib 710, the reinforcement ribs 715, the slide ribs 716, the first engagement ribs 717, the second engagement ribs 718, and the reinforcement ribs 719*a*, 719*b* and 719*c* are formed on the second side 71*b* of the MP tray cover 71 and project in the second direction from the second side 71*b*.

The handhold rib 710 is formed at an upstream end of the MP tray cover 71 in the first direction and extends from a left end to a right end of the MP tray cover 71. The handhold rib 710 projects away from the second side 71*b* in the second direction, and when moving the MP tray cover 71 from the closed position to the open position, the user can easily move the MP tray cover 71 by placing his hand on the handhold rib 710.

The reinforcement ribs 715 are formed at positions overlapping the boss holes 711B and the positioning bosses 713*a* and 713*b* in the first direction and between the positioning bosses 713*a* and 713*b* in the right-left direction. The reinforcement ribs 715 project away from the second side 71*b* in the second direction. The rigidity of the MP tray cover 71 is improved by forming the reinforcement ribs 715.

The reinforcement ribs 715 are at least partially covered by the extension cover 73 when the MP tray cover 71 is at the open position. This prevents the reinforcement ribs 715 from being visible to the user when the MP tray cover 71 is at the open position.

Portions of the reinforcement ribs 715 which are exposed when the MP tray cover 71 is at the open position and the extension tray 74 is at the stowed position can be covered with the extension tray 74 by moving the extension tray 74 to the pulled-out position. This can further prevent the reinforcement ribs 715 from being visible to the user.

The slide ribs 716 extend in the first direction at a central part of the MP tray cover 71 in the right-left direction. The slide ribs 716 are formed in pairs on the left and right sides across the center line C of the MP tray cover 71. The slide ribs 716 project away from the second side 71*b* of the MP tray cover 71 in the second direction and slidably support the extension tray 74 which moves between the stowed position and the pulled-out position. Upper surfaces of the slide ribs 716 slope away from the second side 71*b* of the MP tray cover 71 from the downstream side to the upstream side in the first direction.

The first engagement ribs 717 are formed at a downstream end portion of the MP tray cover 71 in the first direction. The first engagement ribs 717 are formed in pairs on the left and right sides across the center line C of the MP tray cover 71. The first engagement ribs 717 project away from the second side 71*b* of the MP tray cover 71 in the second direction. The first engagement ribs 717 engage the extension tray 74 that has moved to the stowed position (see FIG. 13) to hold the extension tray 74 at the stowed position.

The second engagement ribs 718 are formed on the MP tray cover 71 between the reinforcement ribs 715 and the first engagement ribs 717 in the first direction. The second engagement ribs 718 are formed in pairs on the left and right sides across the center line C of the MP tray cover 71. The second engagement ribs 718 project away from the second side 71*b* of the MP tray cover 71 in the second direction. The second engagement ribs 718 engage the extension tray 74 that has moved to the pulled-out position (see FIG. 14) to hold the extension tray 74 at the pulled-out position.

The reinforcement ribs 719*a* are formed on the MP tray cover 71 downstream of the first engagement ribs 717 in the first direction. The reinforcement ribs 719*b* are formed at the left end portion of the MP tray cover 71 and the reinforcement ribs 719*c* are formed at the right end portion of the MP tray cover 71. The reinforcement ribs 719*a*, 719*b*, and 719*c* project away from the second side 71*b* of the MP tray cover 71 in the second direction. The rigidity of the MP tray cover 71 is improved by forming the reinforcement ribs 719*a*, 719*b*, and 719*c*.

[Support Structure of MP Tray Cover by Front Cover]

As shown in FIG. 11, the front cover 21 has support holes 211 configured to rotatably support the rotary shafts 752 of the guide members 75. By inserting the rotary shafts 752 into the support holes 211, the MP tray cover 71 to which the guide members 75 are attached can be rotatably supported by the front cover 21. The rotary shafts 752 are supported by the front cover 21 so that the MP tray cover 71 can rotate about the rotation axis X with respect to the front cover 21 of the device body 2.

In the present embodiment, each rotary shaft 752 is formed into a cylindrical boss-shape, and the front cover 21 is formed with the support holes 211 into which the rotary shafts 752 fit. However, each rotary shaft 752 may be formed into a cylindrical hole-shape, and the front cover 21 may be formed with cylindrical bosses that fit into the rotary shafts 752.

The support holes 211 of the front cover 21 are formed at two positions corresponding to the first guide member 75A and the second guide member 75B. The support hole 211 into which the rotary shaft 752 of the first guide member 75A is to be inserted is formed to the left of the center line C, and the support hole 211 into which the rotary shaft 752 of the second guide member 75B is to be inserted is formed to the right of the center line C.

[Extension Tray]

Figure 13:
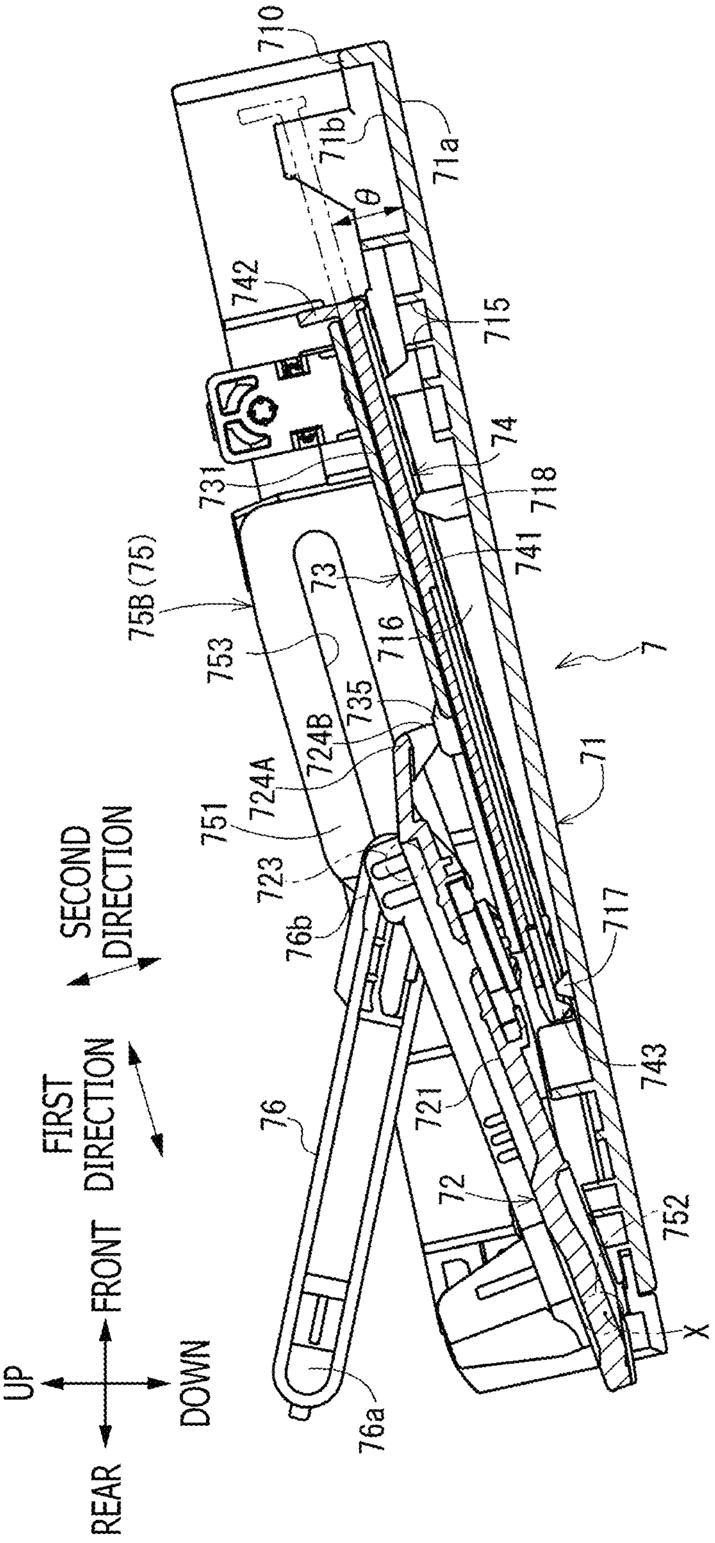
FIG. 13 is a side cross-sectional view showing a sheet tray in a state where the MP tray cover is at the open position and the extension tray is at a stowed position.
Figure 14:
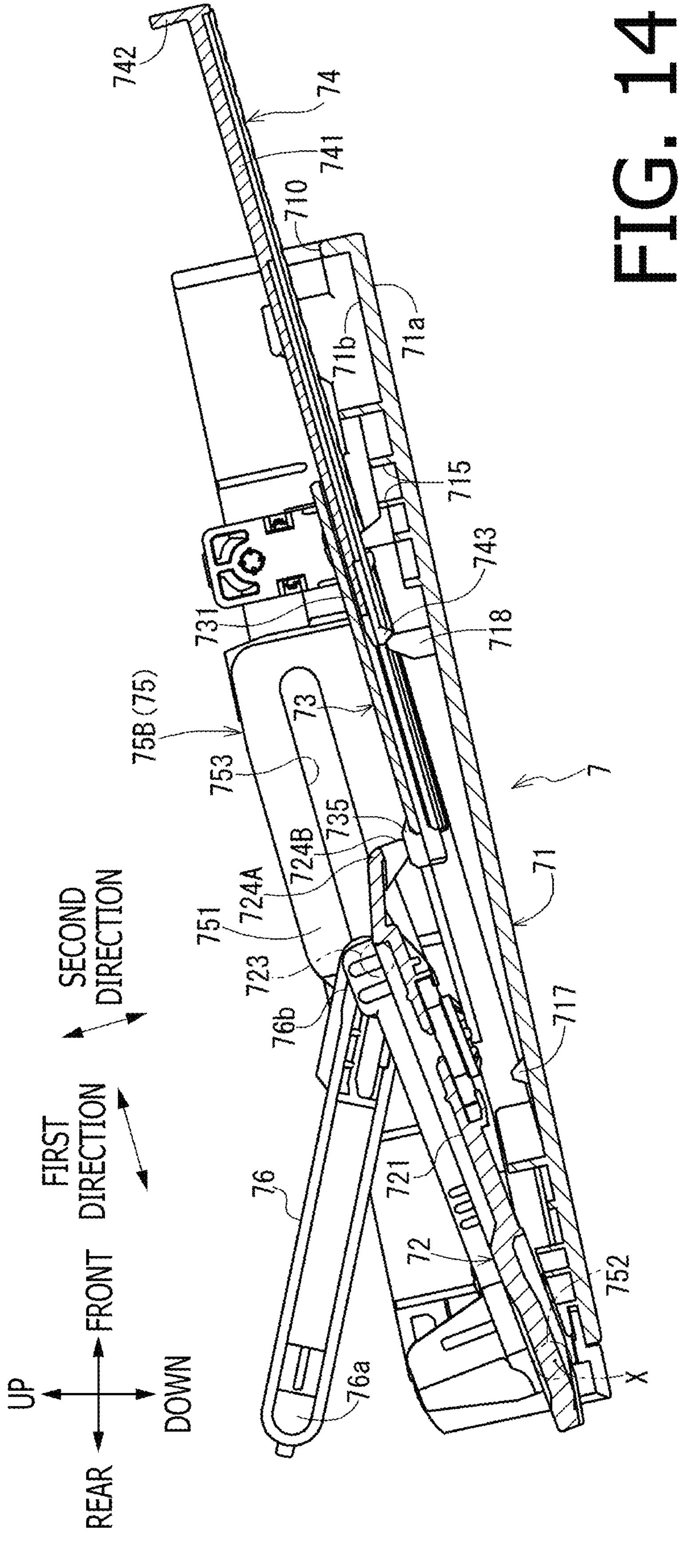
FIG. 14 is a side cross-sectional view showing the sheet tray in a state where the MP tray cover is at the open position and the extension tray is at a pulled-out position.

As shown in FIGS. 13 and 14, the extension tray 74 has a support surface 741, a sheet stopper 742, and engagement pawls 743.

The support surface 741 is formed by a plate-like member that is disposed between the extension cover 73 and the MP tray cover 71 when the extension tray 74 is at the stowed position. The extension tray 74 is configured to support the sheets S with the support surface 741 together with the MP tray 72 when the extension tray 74 is at the pulled-out position.

The sheet stopper 742 projects in the second direction from an upstream end of the support surface 741. The sheet stopper 742 is exposed upstream in the first direction from between the extension cover 73 and the MP tray cover 71 when the extension tray 74 is at the stowed position.

When pulling the extension tray 74 at the stowed position out to the pulled-out position, the sheet stopper 742, which is exposed from between the extension cover 73 and the MP tray cover 71, can be grasped by the user to easily pull the extension tray 74 out to the pulled-out position. The sheet stopper 742 can also prevent the sheet S supported by the extension tray 74 from slipping off.

The engagement pawls 743 are formed at a downstream end of the support surface 741 in the first direction and are configured to engage the first engagement ribs 717 and second engagement ribs 718 of the MP tray cover 71. Specifically, as shown in FIG. 13, the engagement pawls 743 engage the first engagement ribs 717 of the MP tray cover 71 to hold the extension tray 74 at the stowed position when the extension tray 74 is moved to the stowed position. As shown in FIG. 14, the engagement pawls 743 engage the second engagement ribs 718 of the MP tray cover 71 to hold the extension tray 74 at the pulled-out position when the extension tray 74 is moved to the pulled-out position.

The extension tray 74 is supported to be movable between the stowed position and the pulled-out position by the extension cover 73 and the slide ribs 716 of the MP tray cover 71. The extension tray 74 is supported in an inclined attitude at which the upstream side of the extension tray 74 in the first direction is farther from the second side 71*b* of the MP tray cover 71 than the downstream side of the extension tray 74 in the first direction. The inclination angle of the extension tray 74 supported by the extension cover 73 and the MP tray cover 71 with respect to the MP tray cover 71 is θ.

As described above, the extension tray 74 at the stowed position is supported in the inclined attitude at which the upstream side in the first direction is farther from the second side 71*b* than the downstream side in the first direction. As a result, a larger space is formed between the upstream end of the extension tray 74 and the MP tray cover 71 than between the downstream end of the extension tray 74 and the MP tray cover 71.

Therefore, it is possible to form the reinforcement ribs 715, which project away from the second side 71*b* and extend from the second side 71*b* toward the extension tray 74, at a portion of the MP tray cover 71 where the upstream end of the extension tray 74 in the first direction is located. By forming the reinforcement ribs 715, the rigidity of the MP tray cover 71 can be improved.

A pull-out direction of the extension tray 74 from the stowed position toward the pulled-out position is inclined so that the extension tray 74 moves away from the second side 71*b* of the MP tray cover 71 as the extension tray 74 moves from downstream to upstream in the first direction. The inclination angle of the pull-out direction of the extension tray 74 with respect to the second side 71*b* is θ. The direction from the downstream side to the upstream side in the first direction is a direction away from the MP tray 72 in the first direction.

As described above, the pull-out direction of the extension tray 74 is inclined so that the extension tray 74 moves away from the second side 71*b* as the extension tray 74 is moved away from the MP tray 72. Therefore, when the extension tray 74 is pulled out from the stowed position, it is possible to suppress interference of the extension tray 74 with the handhold rib 710 located downstream of the extension tray 74 at the stowed position in the pull-out direction.

[MP Tray]

Figure 3:
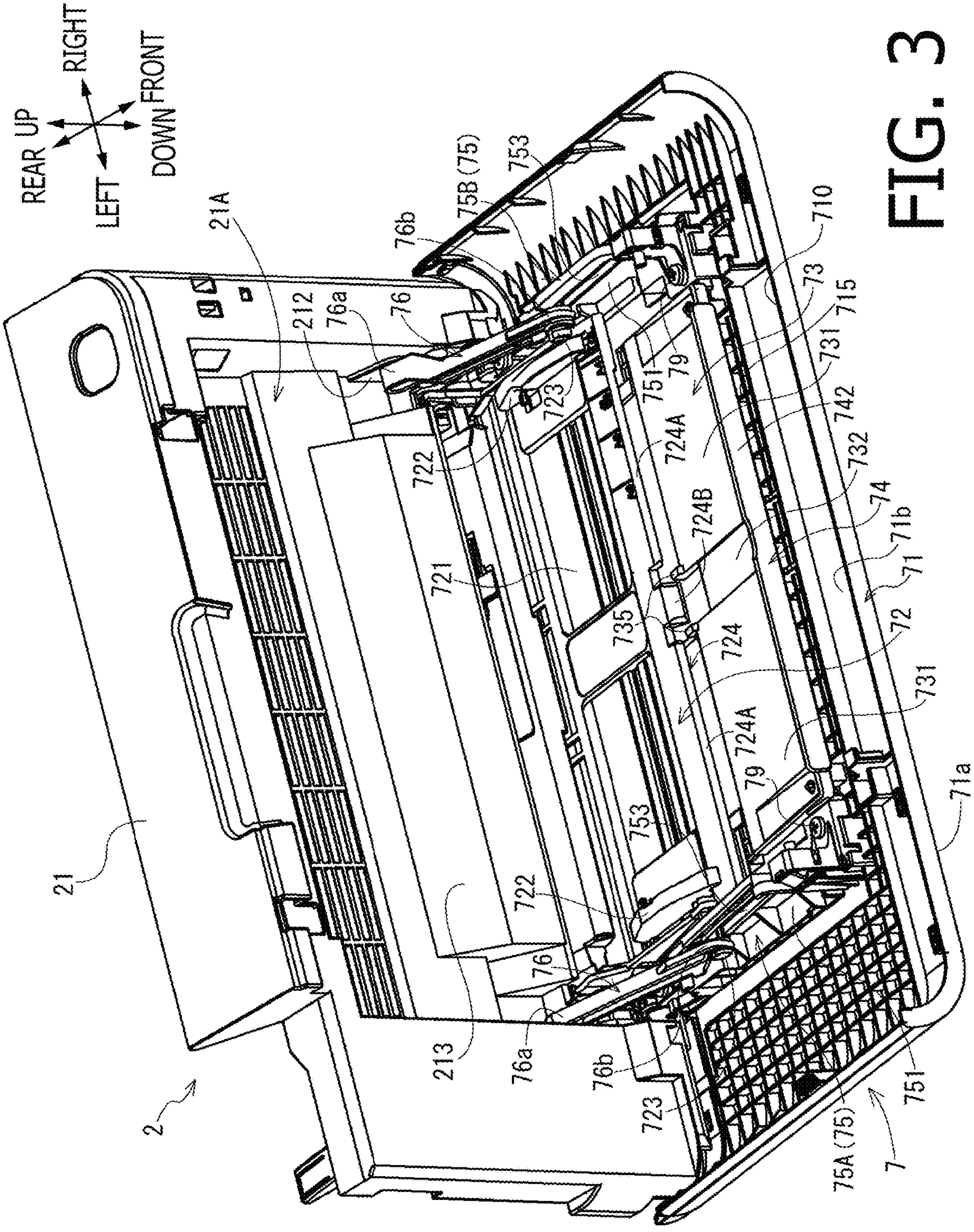
FIG. 3 is a perspective view of a device body of the image forming apparatus viewed from the front left in a state where an MP tray cover is at an open position.
Figure 4:
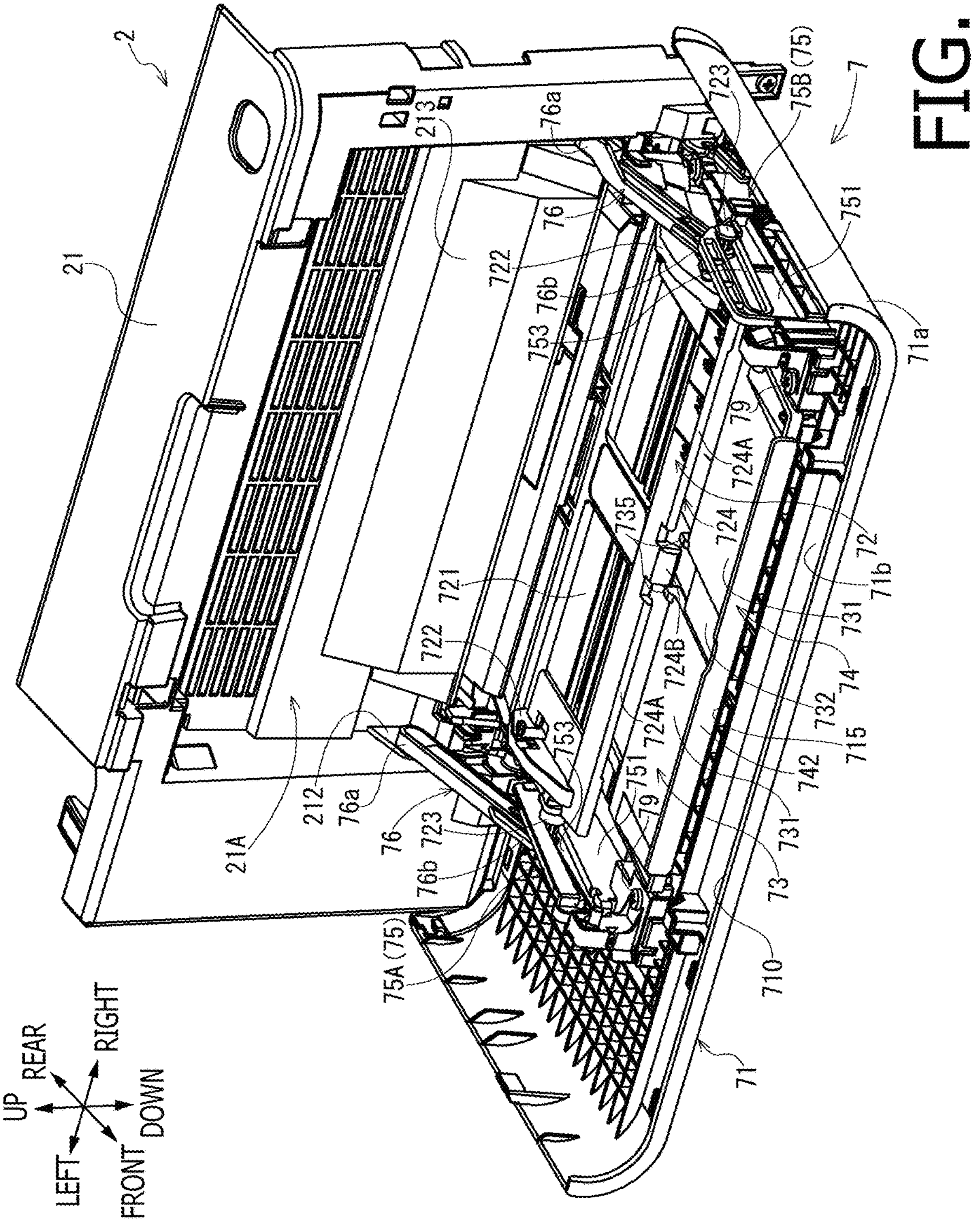
FIG. 4 is a perspective view of the device body of the image forming apparatus viewed from the front right in a state where the MP tray cover is at the open position.
Figure 5:
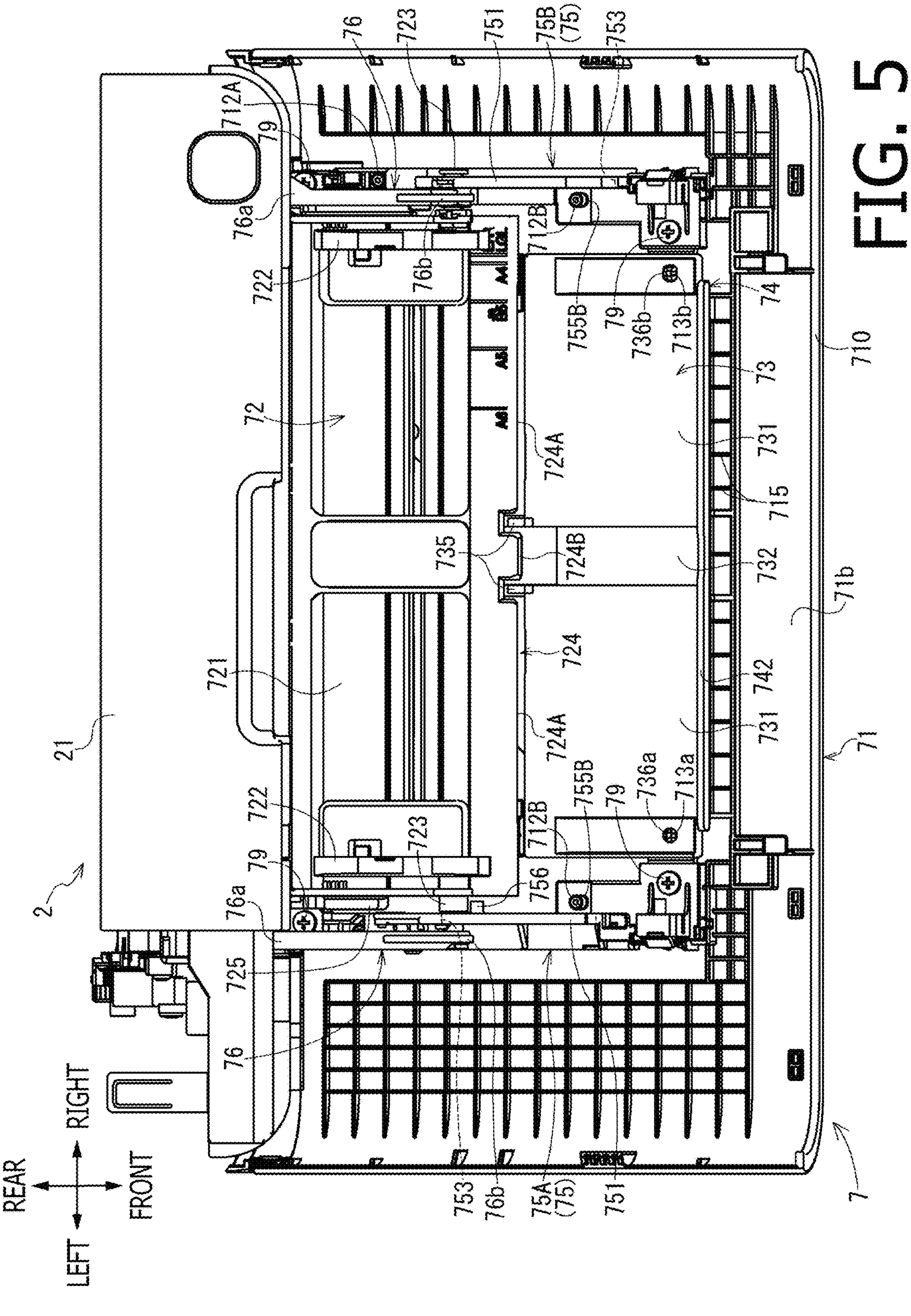
FIG. 5 is a plan view of the device body of the image forming apparatus in a state where the MP tray cover is at the open position.

As shown in FIGS. 3 to 5, the MP tray 72 has connecting bosses 723 projecting in the right-left direction. The connecting bosses 723 are provided at the left and right ends of the MP tray 72. The connecting boss 723 on the left side projects leftward from the left end of the MP tray 72, and the connecting boss 723 on the right side projects rightward from the right end of the MP tray 72.

The connecting bosses 723 of the MP tray 72 are movably fitted into the long holes 753 of the guide members 75. The connecting boss 723 on the left side fits into the long hole 753 of the first guide member 75A from the right, and the connecting boss 723 on the right side fits into the long hole 753 of the second guide member 75B from the left.

The MP tray 72 is movably supported in the first direction by the MP tray cover 71 by slidingly fitting the connecting boss 723 of the MP tray 72 into the long hole 753 of the guide member 75.

As shown in FIGS. 3 to 5, the image forming apparatus 1 includes connecting arms 76 that connect the front cover 21 of the device body 2 and the MP tray 72. Each connecting arm 76 has a first end 76*a* that is pivotably supported by the front cover 21 and a second end 76*b* that is connected to the connecting boss 723 of the MP tray 72. The front cover 21 has support parts 212 that support the first ends 76*a* of the connecting arms 76. The support parts 212 are disposed above the support hole 211.

The connecting arm 76 connected to the connecting boss 723 on the left is on the left side of the first guide member 75A on the left. The connecting arm 76 connected to the connecting boss 723 on the right is on the left side of the second guide member 75B on the right.

Figure 15:
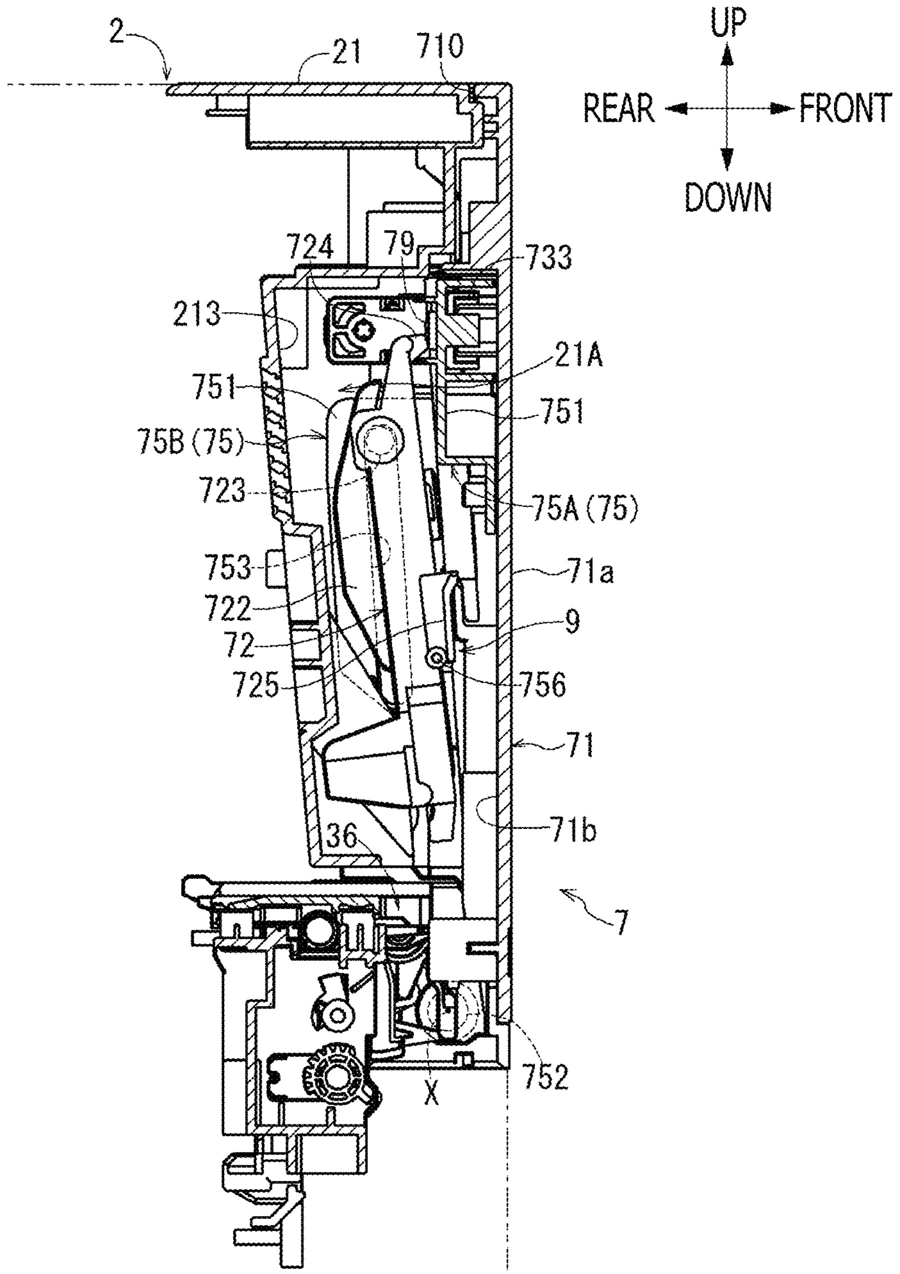
FIG. 15 is a side cross-sectional view showing the sheet tray in a state where the MP tray cover is at the closed position.

As shown in FIG. 15, when the MP tray cover 71 is at the closed position, the connecting bosses 723 of the MP tray 72 are in the long holes 753 of the guide members 75 at ends away from the rotary shafts 752. The MP tray 72 moves away from the rotary shafts 752 in the first direction as the connecting bosses 723 are guided by the long holes 753 of the guide members 75.

Figure 16:
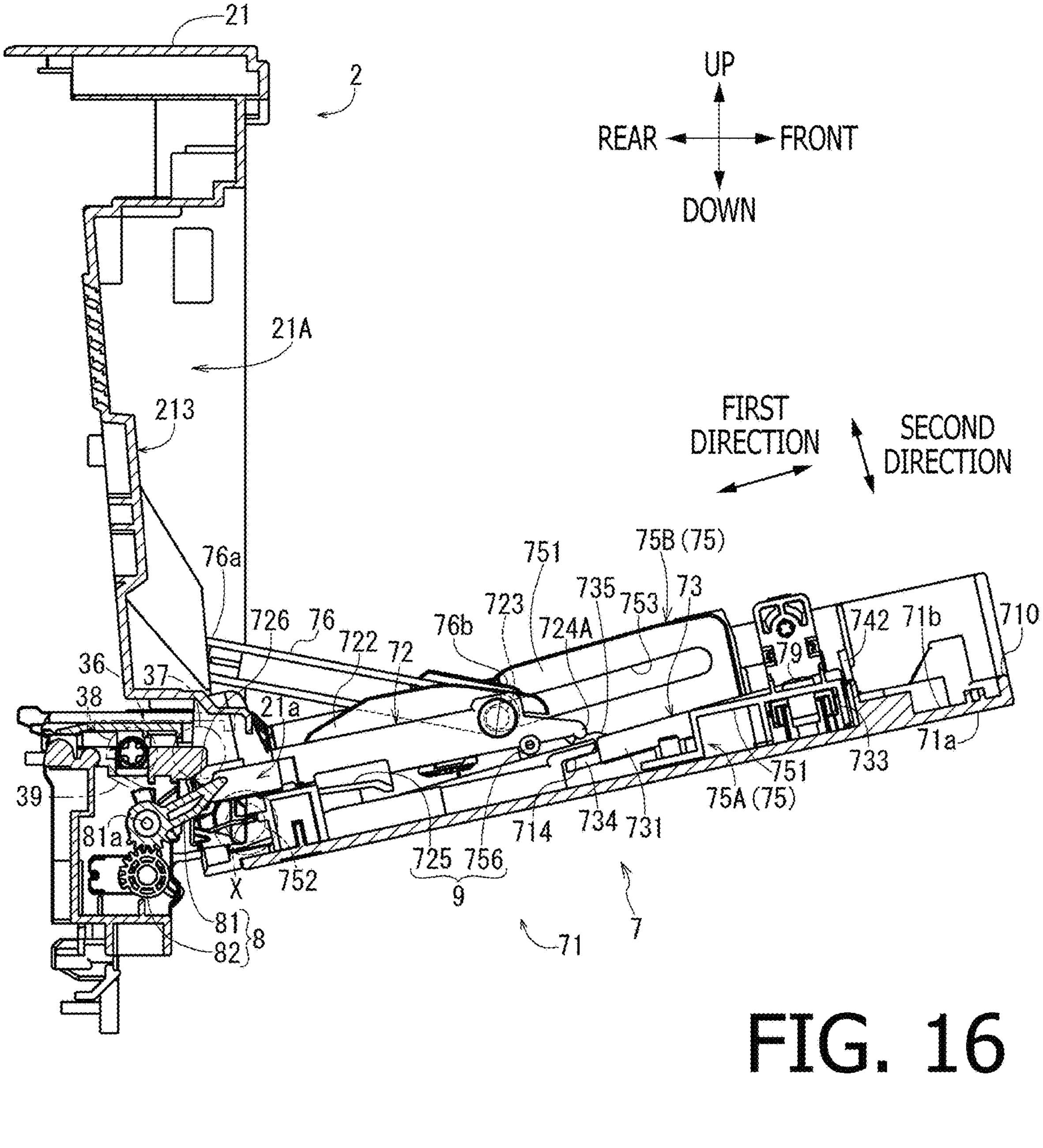
FIG. 16 is a side cross-sectional view showing the sheet tray in a state where the MP tray cover is at the open position and an MP tray is moved to a proximity position by an elevating mechanism.

As shown in FIG. 16, when the MP tray cover 71 is at the open position, the connecting bosses 723 of the MP tray 72 are in the long holes 753 of the guide members 75 at ends away from the rotary shafts 752 at ends near the rotary shaft 752. The MP tray 72 moves closer to the rotary shafts 752 in the first direction than when the MP tray cover 71 is at the closed position as the connecting bosses 723 are guided by the long holes 753 of the guide members 75.

When the MP tray cover 71 moves from the open position to the closed position, the connecting arms 76 rotate about the first ends 76*a* in accordance with the movement of the MP tray cover 71, and the connecting bosses 723 connected to the connecting arms 76 move from the ends in the long holes 753 of the guide members 75 near the rotary shafts 752 to the ends in the long holes 753 of the guide members 75 away from the rotary shafts 752. As a result, the MP tray 72 moves toward the upstream side in the first direction with respect to the MP tray cover 71.

On the other hand, when the MP tray cover 71 moves from the closed position to the open position, the connecting arms 76 rotate about the first ends 76*a* in accordance with the movement of the MP tray cover 71, and the connecting bosses 723 connected to the connecting arms 76 move from the ends in the long holes 753 of the guide members 75 away from the rotary shafts 752 to the ends in the long holes 753 of the guide members 75 near the rotary shafts 752. As a result, the MP tray 72 moves toward the downstream side in the first direction with respect to the MP tray cover 71.

As described above, the MP tray 72 moves in the first direction with respect to the MP tray cover 71 by being guided by the long holes 753 of the guide members 75 as the MP tray cover 71 moves between the open position and the closed position.

In other words, the long holes 753 of the guide members 75 guide the movement of the MP tray 72 and are guides in the guide member 75 for the MP tray 72. The MP tray cover 71 supports the MP tray 72 to be movable in accordance with the rotation of the MP tray cover 71 between the open position and the closed position.

Figure 6:
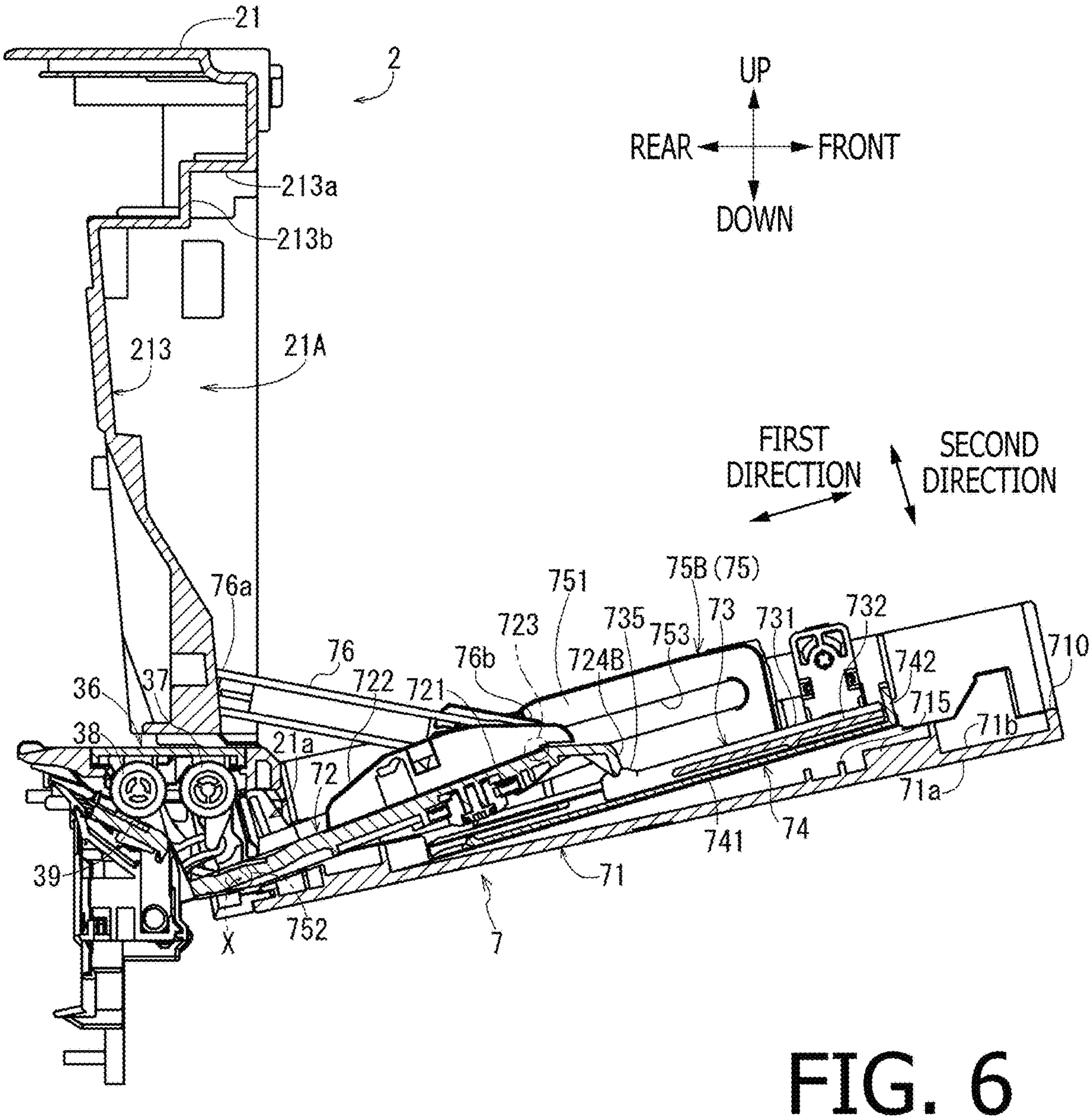
FIG. 6 is a side cross-sectional view of the device body in a state where the MP tray cover is at the open position.
Figure 17:
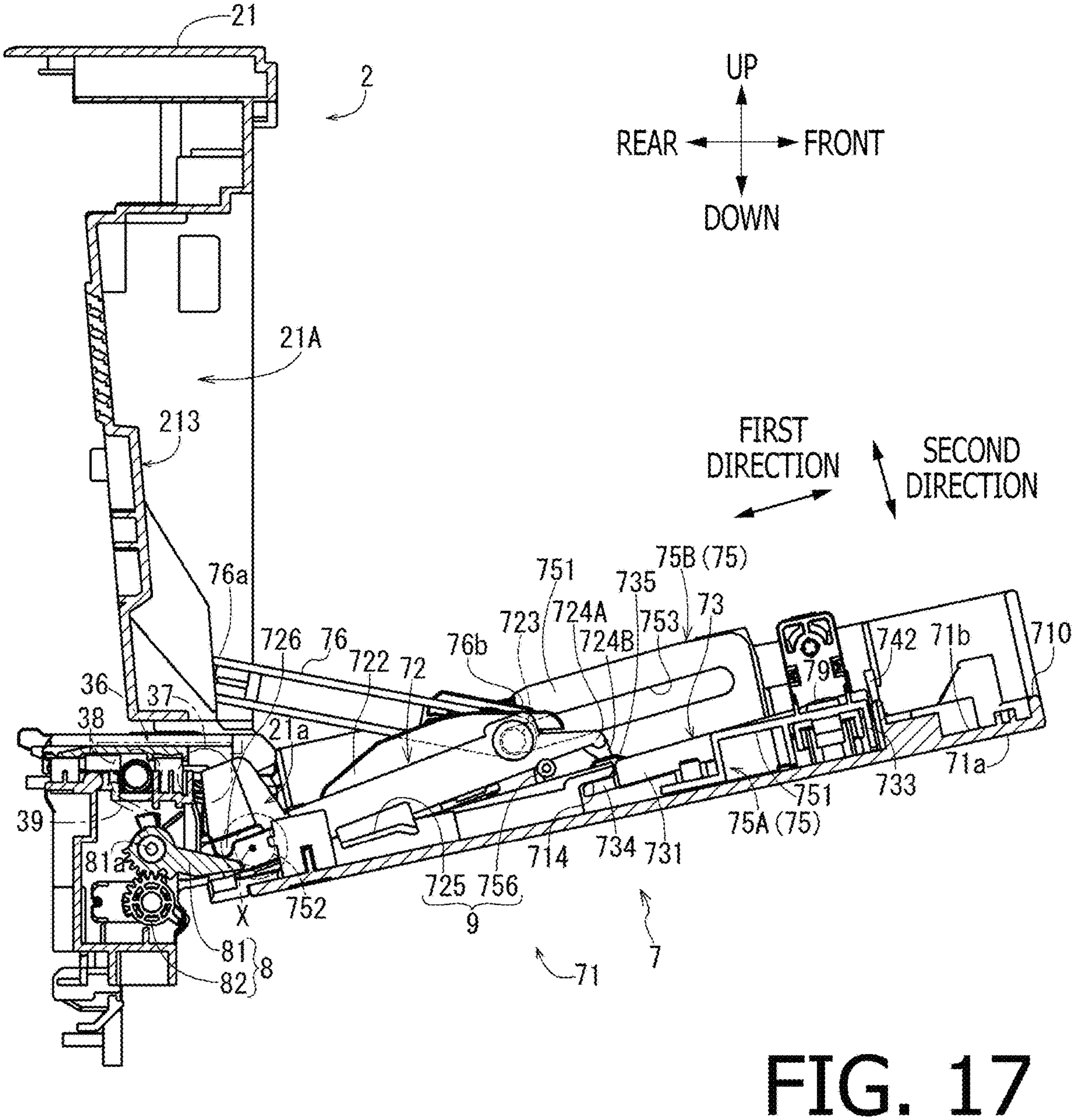
FIG. 17 is a side cross-sectional view showing the sheet tray in a state where the MP tray cover is at the open position and the MP tray is moved to a separated position by the elevating mechanism.

As shown in FIGS. 3, 6 and 17, an upstream end 724 in the first direction of the MP tray 72 has first ends 724A and a second end 724B. The second end 724B is at a central portion of the MP tray 72 in the right-left direction, and the first ends 724A are on the left and right of the second end 724B. A lower end of the second end 724B projects downwardly than lower ends of the first ends 724A. In the first direction, the upstream end 724 of the MP tray 72 is an end on the extension cover 73 side.

[MP Tray Elevating Mechanism]

As shown in FIGS. 16 and 17, the image forming apparatus 1 includes an elevating mechanism 8. The elevating mechanism 8 is a mechanism for moving the MP tray 72 between a proximity position at which the MP tray 72 is close to the sheet feeding roller 37 of the sheet conveyer 36 (i.e., the position shown in FIG. 16), and a separated position at which the MP tray 72 is away from the sheet feeding roller 37 than when at the proximity position (i.e., the position shown in FIG. 17), when the MP tray cover 71 is at the open position. The MP tray 72 has convex parts 726 projecting in the right-left direction at a downstream end portion in the first direction. The convex parts 726 are at the left and right ends of the MP tray 72.

The elevating mechanism 8 includes elevation levers 81 and drive gears 82. The elevation levers 81 are supported by the device body 2 rotatably about a rotation axis 81*a* and are configured to engage the convex parts 726. The drive gears 82 are input with driving force from a driving source provided in the image forming apparatus 1, and the input driving force drives the elevation levers 81. The elevation levers 81 and the drive gears 82 are provided to the left and right of the MP tray 72.

In the elevating mechanism 8, the elevation levers 81 are driven by the drive gears 82 and rotate upward to engage the convex parts 726 from below. The elevation levers 81 that engage the convex parts 726 push the convex parts 726 upward, thereby moving the MP tray 72 to the proximity position.

In the elevating mechanism 8, the upward pressure to the convex parts 726 by the elevation levers 81 is removed when the elevation levers 81 are driven by the drive gears 82 and rotated downward. The MP tray 72, from which the upward pressure is removed, moves to the separated position by moving downward under its own weight.

As the MP tray 72 moves between the proximity position and the separated position, the upstream end 724 of the MP tray 72 moves in the vertical direction. For example, when the MP tray 72 moves to the proximity position, the upstream end 724 moves downward, and when the MP tray 72 moves to the separated position, the upstream end 724 moves upward. When the MP tray 72 is at the separated position, the upstream end 724 is located higher than the upstream end 724 when the MP tray 72 is at the proximity position.

When the MP tray cover 71 is at the open position and the MP tray 72 is at the separated position, a gap is formed in the vertical direction between the support surface 721 of the MP tray 72 and the sheet guiding surface 731 of the extension cover 73.

On the other hand, when the MP tray cover 71 is at the open position and the MP tray 72 is at the separated position, the lower end of the second end 724B of the MP tray 72 is closer to the second side 71*b* of the MP tray cover 71 than the tip surfaces 735*a* of the second projections 735 of the extension cover 73.

In other words, at least part of the lower end of the upstream end 724 of MP tray 72 is closer to MP tray cover 71 than an upper end of the downstream end in the first direction of the extension cover 73.

As a result, a gap between the support surface 721 of the MP tray 72 and the sheet guiding surface 731 of the extension cover 73 is filled by the second end 724B of the MP tray 72 and the second projections 735 of the extension cover 73.

With such configuration, it is possible to prevent the sheets S from being inserted into the gap between the support surface 721 of the MP tray 72 and the sheet guiding surface 731 of the extension cover 73 when placing the sheets S on the MP tray 72 with the second end 724B of the MP tray 72 and the second projections 735 of the extension cover 73.

When the MP tray 72 is moved to the proximity position by the elevating mechanism 8, the downstream end in the first direction of the MP tray 72 moves upward, and when the MP tray 72 is moved to the separated position, the downstream end in the first direction of the MP tray 72 moves downward. The downstream end in the first direction of the MP tray 72 at the separated position is closer to the MP tray cover 71 than the downstream end in the first direction of the MP tray 72 at the proximity position.

[Relationship Between Extension Tray and Device Body when MP Tray Cover is at Closed Position]

Figure 18:
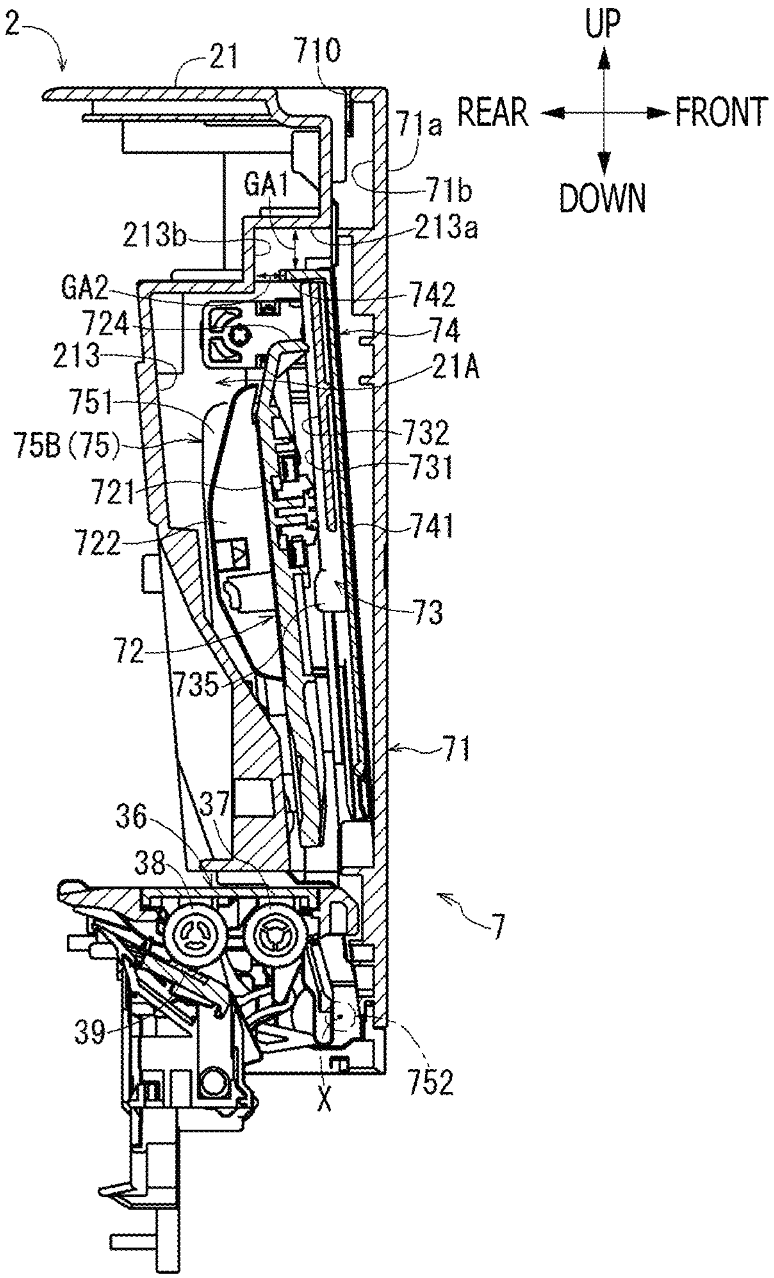
FIG. 18 is a side cross-sectional view showing a gap between a compartment wall of the device body and the extension tray when the MP tray cover is at the closed position.

As shown in FIG. 18, the front cover 21 has a chamber 21A that accommodates the MP tray 72 when the MP tray cover 71 is at the closed position. When the MP tray cover 71 is at the closed position, in addition to the MP tray 72, the extension cover 73 and the extension tray 74 at the stowed position are accommodated in the chamber 21A.

The front cover 21 has a compartment wall 213 that separates the chamber 21A from the inside of the device body 2. The compartment wall 213 has an upper wall 213*a* disposed above the sheet stopper 742 of the extension tray 74 and a front wall 213*b* disposed in front of the sheet stopper 742.

In the vertical direction, there is gap GA1 between the top wall 213*a* and the seat stopper 742. In the front-back direction, there is a gap GA2 between the front wall 213*b* and the seat stopper 742.

As described above, when the MP tray cover 71 is at the closed position, the extension tray 74 at the stowed position is at a position where a gap is formed between the sheet stopper 742 at the end of the extension tray 74 and the compartment wall 213 of the front cover 21 of the device body 2.

With such configuration, a flow path for allowing air to flow between the extension tray 74 and the compartment wall 213 can be secured by the gaps GA1 and GA2 when the MP tray cover 71 is at the closed position.

When the extension tray 74 is moved toward the stowed position, the extension tray 74 may stop before the engagement pawls 743 of the extension tray 74 and the first engagement ribs 717 of the MP tray cover 71 engage, and the extension tray 74 may not move completely to the stowed position. Even in such a case, the extension tray 74 does not interfere with the compartment wall 213 or other members of the device body 2, and the MP tray cover 71 can be moved smoothly to the closed position.

[MP Tray Restricting Mechanism]

As shown in FIG. 5 and FIGS. 15 to 17, the image forming apparatus 1 includes a restricting mechanism 9 that restricts the MP tray 72 from moving from the separated position to the proximity position when the MP tray cover 71 moves from the open position to the closed position. The restricting mechanism 9 includes the boss 756 and a rail 725.

The boss 756 projects from the right side surface of the guide body 751 to the right, which is a direction toward the MP tray 72.

The rail 725 is formed at the left end of the MP tray 72. The rail 725 extends from the left end of the support surface 721 of the MP tray 72 toward the left, which is a direction toward the first guide member 75A. The rail 725 formed at the left end of the MP tray 72 extends in the first direction and is configured to engage the boss 756 of the first guide member 75A.

When MP tray cover 71 is at the closed position, the rail 725 and the boss 756 are engaged in a state where the MP tray 72 is at the separated position. The MP tray 72 is held at the separated position by the engagement of the rail 725 and the boss.

In other words, in the state where the rail 725 and the boss 756 are engaged, the rail 725 of the MP tray 72 is located between the boss 756 of the first guide member 75A fixed to the MP tray cover 71 and the MP tray cover 71. Therefore, the MP tray 72 at the separated position is restricted from moving to the proximity position, that is, toward the side away from the MP tray cover 71, by the boss 756 which is engaged with the rail 725.

On the other hand, when the MP tray cover 71 is at the open position, the rail 725 and boss 756 are apart from each other in the first direction, that is, the rail 725 and boss 756 are disengaged.

The MP tray 72 is configured to move in the first direction with respect to the MP tray cover 71 as the MP tray cover 71 moves between the open position and the closed position.

For example, when the MP tray cover 71 at the closed position moves toward the open position, the MP tray 72 moves with respect to the MP tray cover 71 toward the downstream side in the first direction, and the rail 725 and the boss 756 move away with respect to each other in the first direction. As a result, in the process of the MP tray cover 71 moving toward the open position, the rail 725 and the boss 756 are separated from each other and disengage.

When the MP tray cover 71 is at the open position, the rail 725 and the boss 756 are disengaged, allowing the MP tray 72 to move between the separated position and the proximity position. Therefore, the MP tray 72 can be moved between the separated position and the proximity position with the elevating mechanism 8.

On the contrary, when the MP tray cover 71 at the open position moves toward the closed position, the MP tray 72 moves with respect to the MP tray cover 71 toward the upstream side in the first direction, and the rail 725 and the boss 756, which were separated from each other, move toward each other in the first direction. As a result, in the process of the MP tray cover 71 moving toward the closed position, the rail 725 and the boss 756 engage.

When the MP tray cover 71 at the open position moves toward the closed position in the state where the MP tray 72 is at the separated position, the MP tray cover 71 moves toward the closed position with the MP tray 72 maintaining the separated position by its own weight.

When the MP tray cover 71 at the open position moves toward the closed position in the state where the MP tray 72 is at the proximity position, the elevating levers 81 of the elevating mechanism 8 are separated from the convex parts 726 of the MP tray 72 in the process of the MP tray cover 71 moving to the closed position, and the MP tray 72 moves from the proximity position to the separated position by its own weight.

As the MP tray cover 71 gets close to the closed position in the state where the MP tray 72 has moved to the separated position, the MP tray 72 is now supported in a suspended state by the connecting arms 76 connected to the connecting bosses 723.

In this state, the MP tray 72 may move between the separated position and the proximity position about the connecting boss 723. In particular, when the MP tray cover 71 moves from the closed position to the open position at a high speed, the MP tray 72 may rattle between the separated position and the proximity position and may interfere with the compartment wall 213 or other members of the device body 2.

However, the image forming apparatus 1 is configured so that, in the process of the MP tray cover 71 moving from the open position to the closed position, the rail 725 and the boss 756 engage to restrict the MP tray 72 from moving from the separated position to the proximity position. Therefore, the rattling of the MP tray 72 when moving the MP tray cover 71 from the open position to the closed position is suppressed, thereby preventing the MP tray 72 from interfering with the device body 2.

Since the MP tray 72 moves in the first direction with respect to the MP tray cover 71 as the MP tray cover 71 moves between the open position and the closed position, the engagement and disengagement of the rail 725 and the boss 756 of the restricting mechanism 9 can be smoothly switched in accordance with the movement of the MP tray cover 71.

In the present embodiment, the boss 756 is formed only on the first guide member 75A and the rail 725 is formed only on the left end of the MP tray cover 71. However, the boss 756 may be formed only on the second guide member 75B and the rail 725 may be formed only on the right end of the MP tray cover 71. Furthermore, the boss 756 may be formed on both the first guide member 75A and the second guide member 75B, and the rail 725 may be formed on both the left end and the right end of the MP tray cover 71.

In the present embodiment, the boss 756 is formed on guide member 75 and the rail 725 is formed on MP tray cover 71. However, a rail may be formed on the guide member 75 and a boss may be formed on the MP tray cover 71.

While the disclosure has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the disclosure, and not limiting the disclosure. Various changes may be made without departing from the spirit and scope of the disclosure. Therefore, the disclosure is intended to embrace all known or later developed alternatives, modifications, variations, improvements, and/or substantial equivalents.

The sheet feeding opening 21*a* is an example of an opening that the device body has according to aspects of the present disclosure. The MP tray cover 71 is an example of a cover body supported by the device body to be rotatable about a rotation axis according to aspects of the present disclosure. The MP tray 72 is an example of a first tray configured to support sheets to be fed to the sheet conveyer according to aspects of the present disclosure. Toner is an example of a developer according to aspects of the present disclosure. The attachment hole 733*a* is an example of a first attachment hole according to aspects of the present disclosure. The attachment hole 754B is an example of a second attachment hole according to aspects of the present disclosure. The first projection 734 is an example of a projection projecting downstream in a sheet feeding direction according to aspects of the present disclosure. The screw 79 is an example of a fastening member according to aspects of the present disclosure. The boss 756 is an example of an engaging part and the rail 725 is an example of an engaged part according to aspects of the present disclosure.

What is claimed is:

1. An image forming apparatus, comprising:

a device body having an opening;

a cover body supported by the device body to be rotatable about a rotation axis and configured to move between an open position to open the opening and a closed position to close the opening by rotating about the rotation axis;

a sheet conveyer provided in the device body;

a first tray configured to support sheets to be fed to the sheet conveyer;

a second tray supported by the cover body and disposed opposite to the sheet conveyer across the first tray when the cover body is at the open position;

a third tray configured to move between a stowed position between the cover body and the second tray and a pulled-out position pulled away from the first tray relative to the stowed position; and two guide members supported by the cover body and provided on both sides in a direction of the rotation axis of the first tray and configured to guide the first tray, wherein:

the second tray has two first attachment holes for fixing the second tray to the cover body at both ends in the direction of the rotation axis, each of the guide members has a second attachment hole for fixing the guide member to the cover body, the first attachment holes overlap the second attachment holes of the guide members, respectively, and the second tray and each of the guide members are fixed to the cover body with a common fastening member inserted into the first attachment hole and the second attachment hole.

2. The image forming apparatus according to claim 1, wherein:

the second tray has a sheet guiding surface configured to guide the sheets and projecting pieces that project in the direction of the rotation axis from the sheet guiding surface, and the first attachment holes are formed to the projecting pieces.

3. The image forming apparatus according to claim 1, wherein:

a plurality of projections projecting downstream in a sheet feeding direction are formed at a downstream end of the second tray in the sheet feeding direction, the cover body has insertion holes into which the projections are to be inserted, and the first attachment holes are at an upstream end of the second tray in the sheet feeding direction.

4. The image forming apparatus according to claim 1, wherein:

a pull-out direction of the third tray from the stowed position toward the pulled-out position is inclined so that the third tray moves away from the cover body as the third tray is moved in a direction away from the first tray.

5. The image forming apparatus according to claim 4, wherein the cover body has reinforcement ribs extending toward the third tray at the stowed position.

6. The image forming apparatus according to claim 1, wherein the third tray at the stowed position is at a position forming a gap between a tip of the third tray and the device body when the cover body is at the closed position.

7. The image forming apparatus according to claim 1, wherein:

the sheet conveyer includes a sheet feeding roller, a separation roller, and a separation pad, the image forming apparatus comprises an elevating mechanism that moves the first tray between a proximity position close to the sheet feeding roller and a separated position away from the sheet feeding roller than the proximity position, and when the cover body is at the open position and the first tray is at the separated position, at least a portion of a lower end of a second tray side end of the first tray is closer to the cover body than an upper end of a first tray side end of the second tray.

8. The image forming apparatus according to claim 1, wherein:

the sheet conveyer includes a sheet feeding roller, a separation roller, and a separation pad, and the image forming apparatus comprises:

an elevating mechanism that moves the first tray between a proximity position close to the sheet feeding roller and a separated position away from the sheet feeding roller than the proximity position; and a restricting mechanism including an engaging part provided to one of the guide members and extending toward the first tray, and an engaged part provided to the first tray in the direction of the rotation axis and extending toward the one of the guide members, the engaging part and the engaged part engaging with each other when the cover body is at the closed position and restricting the first tray from moving to the proximity position.

9. The image forming apparatus according to claim 8, wherein:

when the cover body is at the open position, the engaging part is disengaged from the engaged part, and the engaging part and the engaged part engage in the process of the cover body moving from the open position to the closed position.

10. The image forming apparatus according to claim 9, wherein the first tray moves along the sheet feeding direction with respect to the cover body by being guided by the guide members as the cover body moves between the open position and the closed position.

* * * * *